US012362441B2

(12) United States Patent
Nakamura et al.

(10) Patent No.: US 12,362,441 B2
(45) **Date of Patent: *Jul. 15, 2025**

(54) SECONDARY BATTERY, ELECTRONIC DEVICE, AND ELECTRIC TOOL

(71) Applicant: MURATA MANUFACTURING CO., LTD., Kyoto (JP)

(72) Inventors: Toshikazu Nakamura, Kyoto (JP); Koji Shibutani, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 431 days.

This patent is subject to a terminal disclaimer.

(21) Appl. No.: 18/074,696

(22) Filed: Dec. 5, 2022

(65) Prior Publication Data

US 2023/0102083 A1 Mar. 30, 2023

Related U.S. Application Data

(63) Continuation of application No. PCT/JP2021/019556, filed on May 24, 2021.

(30) Foreign Application Priority Data

Jun. 9, 2020 (JP) ................................ 2020-100252

(51) Int. Cl.
*H01M 50/538* (2021.01)
*H01M 4/02* (2006.01)
(Continued)

(52) U.S. Cl.
CPC ......... *H01M 50/538* (2021.01); *H01M 4/134* (2013.01); *H01M 2004/027* (2013.01); *H01M 2004/028* (2013.01); *H01M 10/0431* (2013.01)

(58) Field of Classification Search
CPC .................................................. H01M 50/538
See application file for complete search history.

(56) References Cited

U.S. PATENT DOCUMENTS

2009/0181288 A1 7/2009 Sato
2013/0316207 A1* 11/2013 Suwa ................. H01M 50/534 429/94
(Continued)

FOREIGN PATENT DOCUMENTS

DE 102018218359 4/2020
JP S5770666 U 4/1982
(Continued)

OTHER PUBLICATIONS

German Office Action issued Feb. 28, 2025 in corresponding German Application No. 11 2021 001 799.3.
(Continued)

*Primary Examiner* — Brian R Ohara
(74) *Attorney, Agent, or Firm* — K&L Gates LLP

(57) ABSTRACT

Provided is a secondary battery, including: an electrode wound body having a structure in which a band-shaped positive electrode and a band-shaped negative electrode are stacked with a separator interposed therebetween and wound; and a battery can that accommodates the electrode wound body, wherein the positive electrode has a positive electrode active material layer on both sides of a band-shaped positive electrode foil, the negative electrode has a negative electrode active material layer on both sides of a band-shaped negative electrode foil, the electrode wound body has a positive electrode foil tab between a winding starting side and a winding ending side of the positive electrode and a negative electrode tab between a winding starting side and a winding ending side of the negative electrode, the positive electrode foil tab has a plate-like part joined on the winding starting side of the positive electrode,
(Continued)

and a comb-like part protruding from the positive electrode, and the comb-like part is a connecting part of the electrode wound body.

20 Claims, 19 Drawing Sheets

(51) Int. Cl.
*H01M 4/134* (2010.01)
*H01M 10/04* (2006.01)

(56) References Cited

U.S. PATENT DOCUMENTS

| | | | | |
|---|---|---|---|---|
| 2016/0260950 | A1 | 9/2016 | Baek et al. | |
| 2019/0312257 | A1 * | 10/2019 | Ishiwatari | H01M 4/62 |
| 2020/0044226 | A1 | 2/2020 | Fukuoka et al. | |
| 2020/0144676 | A1 | 5/2020 | Tsuruta et al. | |

FOREIGN PATENT DOCUMENTS

| | | | | |
|---|---|---|---|---|
| JP | S05770666 | U | 4/1982 | |
| JP | H07192717 | A | 7/1995 | |
| JP | 2009129553 | A | 6/2009 | |
| JP | 2011070916 | A | 4/2011 | |
| JP | 2013025912 | A | 2/2013 | |
| JP | 5770666 | | 1/2024 | |
| KR | 20180113693 | A * | 10/2018 | H01M 10/0431 |
| WO | 2017159094 | A1 | 9/2017 | |
| WO | 2018180828 | A1 | 10/2018 | |
| WO | 2019049485 | A1 | 3/2019 | |
| WO | 2019/050147 | | 11/2022 | |
| WO | 2020/017923 | | 11/2022 | |

OTHER PUBLICATIONS

International Search Report of corresponding PCT application PCT/JP2021/019556, dated Aug. 3, 2021.
Japanese Office Action issued Aug. 8, 2023 in corresponding Japanese Application No. 2022-530105.
German Office Action issued Oct. 8, 2024 in corresponding German Application No. 11 2021 003 195.3.
Chinese Office Action for corresponding CN application No. 202180041932.9, dated Mar. 28, 2025 (7 pages).
Search Report for corresponding CN application No. 202180041932.9, dated Mar. 25, 2025 (2 pages).

* cited by examiner

SECONDARY BATTERY, ELECTRONIC DEVICE, AND ELECTRIC TOOL

CROSS REFERENCE TO RELATED APPLICATIONS

The present application is a continuation of PCT patent application no. PCT/JP2021/019556, filed on May 24, 2021, which claims priority to Japanese patent application no. JP2020-100252, filed on Jun. 9, 2020, the entire contents of which are incorporated herein by reference.

BACKGROUND

The present application relates to a secondary battery, an electronic device, and an electric tool.

Lithium ion batteries have been widely used in machines, tools, and the like, and a structure capable of withstanding repeated charge and discharge have been required. When discharge and charge are repeated, the inner peripheral portion of an electrode wound body contained in a battery can distorts and buckles, so that internal short circuit may occur.

The strength of an inner peripheral portion of an electrode wound body can be increased by disposing a reinforcing plate on a winding starting side of a positive electrode and winding the positive electrode and the reinforcing plate together with a negative electrode, a separator, and the like.

SUMMARY

The present application relates to a secondary battery, an electronic device, and an electric tool.

However, the technique described in the Background section was problematic in that when a positive electrode tab is welded to the reinforcing plate, a large level difference is formed in the inner peripheral portion of the electrode wound body due to the thickness of the positive electrode tab, so that an internal short circuit is likely to occur. There was also another problem that when the thickness of the positive electrode tab is reduced in order to reduce the level difference in the inner peripheral portion, heat is generated when a relatively large current is discharged.

Accordingly, the present application relates to providing a battery that causes neither buckling nor internal short circuit even when repeatedly charged and discharged according to an embodiment.

For solving the above-described problems, the present application relates to, in an embodiment, a secondary battery including: an electrode wound body having a structure in which a band-shaped positive electrode and a band-shaped negative electrode are stacked with a separator interposed therebetween and wound, and a battery can that accommodates the electrode wound body, wherein the positive electrode has a positive electrode active material layer on both sides of a band-shaped positive electrode foil, the negative electrode has a negative electrode active material layer on both sides of a band-shaped negative electrode foil, the electrode wound body has a positive electrode foil tab between a winding starting side and a winding ending side of the positive electrode, and a negative electrode tab between a winding starting side and a winding ending side of the negative electrode, the positive electrode foil tab has a plate-like part joined on the winding starting side of the positive electrode, and a comb-like part protruding from the positive electrode, and the comb-like part is a connecting part of the electrode wound body.

According to an embodiment, a battery can be provided in which the inner peripheral portion of an electrode wound body does not have a level difference and which does not cause internal short circuit even when it is repeatedly charged and discharged. It is noted that the contents of the present application are not to be construed as being limited by the effects illustrated in this description.

DETAILED DESCRIPTION

Hereinafter, one or more embodiments of the present application will be described in further detail including with reference to drawings.

The present application described herein includes suitable examples, and the contents of the present application are not limited thereto.

In an embodiment, a cylindrical lithium ion battery will be described as an example of the secondary battery. A battery other than the lithium ion battery or a battery that has any shape other than the cylindrical shape may be used.

Figure 1:
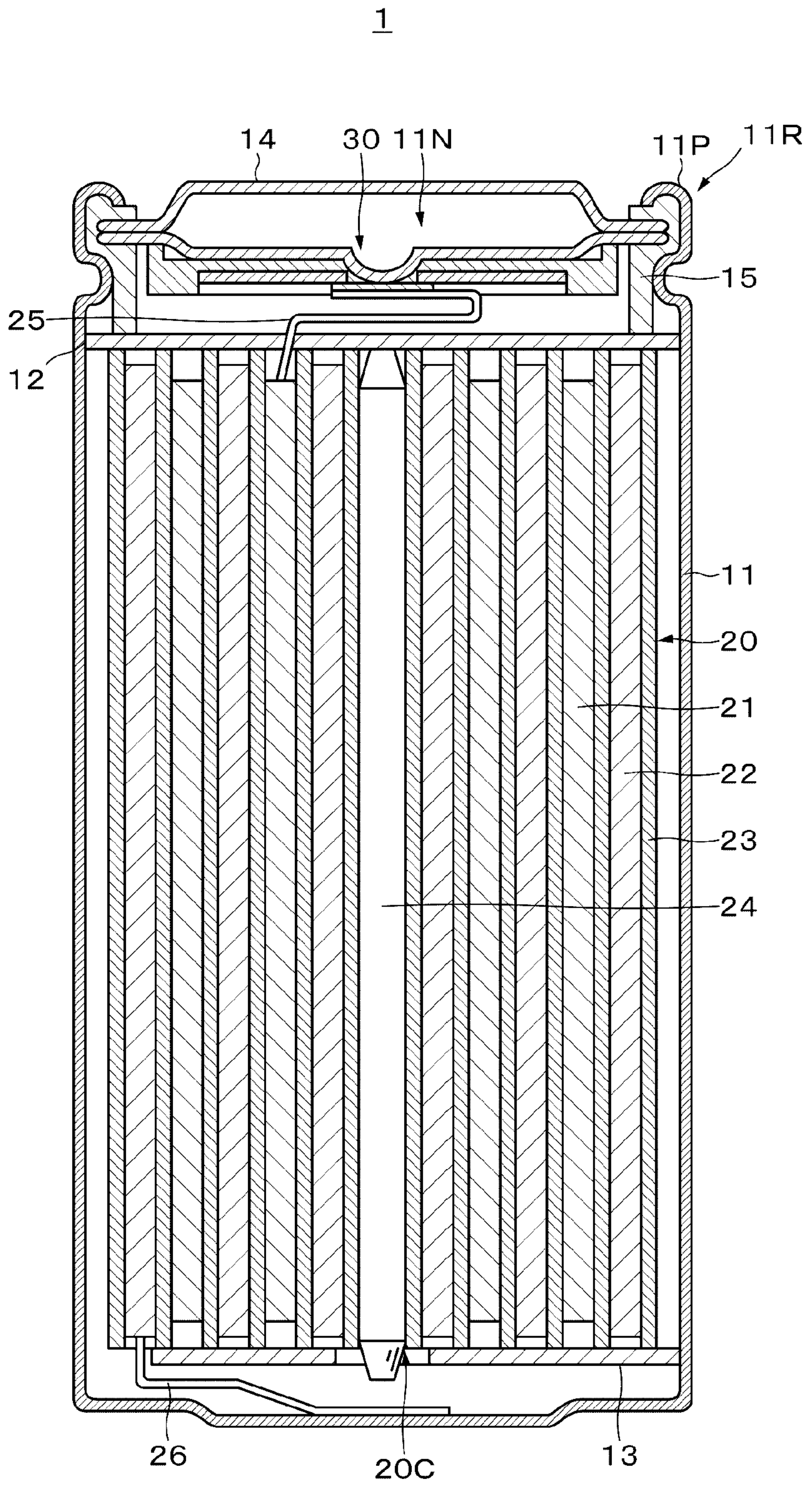
FIG. 1 is a schematic sectional view of a battery according to an embodiment.

First, the overall configuration of the lithium ion battery will be described. FIG. 1 is a schematic sectional view of a lithium ion battery 1. The lithium ion battery 1 is, for example, a cylindrical lithium ion battery 1 including an electrode wound body 20 accommodated inside a battery can 11 as shown in FIG. 1.

Specifically, the lithium ion battery 1 includes a pair of insulating plates 12 and 13 and the electrode wound body 20 inside the battery can 11 having a cylindrical shape. The lithium ion battery 1 may further include, for example, any one or more of a thermal resistance (positive temperature coefficient thermal-resistor, PTC), a reinforcing member, and the like inside the battery can 11.

The battery can 11 is a member that mainly accommodates the electrode wound body 20. The battery can 11 is a cylindrical container whose one end is opened and the other end is closed. That is, the battery can 11 has one end that is opened (open end 11N). The battery can 11 contains any one or more of metal materials such as iron, aluminum, and an alloy thereof. It is noted that any one or more of metal materials, such as nickel, may be plated on a surface of the battery can 11.

The insulating plates 12, 13 are sheet-shaped members each having a surface substantially perpendicular to a winding axis direction (vertical direction in FIG. 1) of the electrode wound body 20. The insulating plates 12, 13 are disposed so as to sandwich together the electrode wound body 20 therebetween. As the materials of the insulating plates 12, 13, polyethylene terephthalate (PET), polypropylene (PP), bakelite, or the like is used. The bakelite includes paper bakelite and cloth bakelite that are produced by applying a phenol resin to paper or cloth and then heating it.

At the open end 11N of the battery can 11, a battery lid 14 and a safety valve mechanism 30 are crimped at a bent portion 11P with a gasket 15 interposed therebetween and a crimped structure 11R (crimp structure) is formed. Thus, the battery can 11 is sealed with the electrode wound body 20 and the like accommodated in the battery can 11.

The battery lid 14 is a member that closes the open end 11N of the battery can 11 with the electrode wound body 20 and the like accommodated in the battery can 11. The battery lid 14 contains the same material as the material forming the battery can 11. A central region of the battery lid 14 protrudes in the vertical direction in FIG. 1. On the other hand, a region (peripheral region) other than the central portion of the battery lid 14 in in contact with the safety valve mechanism 30 with a PTC element 16 interposed therebetween.

The gasket 15 is a member that mainly, by being interposed between the bent portion 11P (also called crimp portion) of the battery can 11 and the battery lid 14, seals a gap between the bent portion 11P and the battery lid 14. To the surface of the gasket 15 may be applied, for example, asphalt or the like.

The gasket 15 contains an insulating material. The type of the insulating material is not particularly limited, but is a polymer material, such as polybutylene terephthalate (PBT) and polypropylene (PP). This is because the gap between the bent portion 11P and the battery lid 14 is sufficiently sealed with the battery can 11 and the battery lid 14 electrically separated from each other.

The safety valve mechanism 30 releases the sealed state of the battery can 11 as necessary mainly when the pressure (internal pressure) inside the battery can 11 rises, thereby releasing the internal pressure. The cause of the rise in the internal pressure of the battery can 11 is, for example, a gas generated due to a decomposition reaction of an electrolytic solution during charging and discharging.

In a cylindrical lithium ion battery, a band-shaped positive electrode 21 and a band-shaped negative electrode 22 are spirally wound with a separator 23 sandwiched therebetween and are accommodated in the battery can 11 in a state of being impregnated with an electrolytic solution. Although not shown in the drawings, in the positive electrode 21 and the negative electrode 22, a positive electrode active material layer and a negative electrode active material layer are formed on one side or both sides of a positive electrode foil and a negative electrode foil, respectively. The material of the positive electrode foil is a metal foil containing aluminum or an aluminum alloy. The material of the negative electrode foil is a metal foil containing nickel, a nickel alloy, copper, or a copper alloy. The separator 23 is a porous insulating film, which allows movement of lithium ions while electrically insulating the positive electrode 21 and the negative electrode 22.

At the center of the electrode wound body 20 is provided a space (center space 20C) formed when winding the positive electrode 21, the negative electrode 22, and the separator 23. In the center space 20C is inserted a center pin 24 (FIG. 1). However, the center pin 24 may be omitted.

To the positive electrode 21 is connected a positive electrode lead 25, and to the negative electrode 22 is connected a negative electrode lead 26. The positive electrode 25 lead contains a conductive material such as aluminum. The positive electrode lead 25 is connected with the safety valve mechanism 30 and electrically connected with the battery lid 14 with the PTC element interposed therebetween. The negative electrode lead 26 contains a conductive material such as nickel. The negative electrode lead 26 is electrically connected with the battery can 11.

The detailed configurations and materials of the positive electrode 21, the negative electrode 22, the separator 23, and the electrolytic solution will be described later.

The positive electrode active material layer contains at least a positive electrode material (positive electrode active material) capable of occluding and releasing lithium, and may further contain a positive electrode binder, a positive electrode conductive agent, and the like. The positive electrode material is preferably a lithium-containing compound (e.g., a lithium-containing composite oxide and a lithium-containing phosphoric acid compound).

The lithium-containing composite oxide has, for example, a layered rock salt-type or spinel-type crystal structure. The lithium-containing phosphoric acid compound has, for example, an olivine-type crystal structure.

The positive electrode binder contains a synthetic rubber or a polymer compound. The synthetic rubber is styrene-butadiene rubber, fluorine-containing rubber, ethylene propylene diene, or the like. The polymer compound is polyvinylidene fluoride (PVdF), polyimide, or the like.

The positive electrode conductive agent is a carbon material such as graphite, carbon black, acetylene black, or ketjen black. It is noted that the positive electrode conductive agent may be a metal material or a conductive polymer.

The surface of the negative electrode foil is preferably roughened. This is because the adhesion of the negative electrode active material layer to the negative electrode foil is improved by a so-called anchor effect. Examples of a method of roughening the surface include a method of forming fine particles by use of an electrolytic method to provide asperities on the surface of the negative electrode foil. A copper foil produced by the electrolytic method is generally called an electrolytic copper foil.

The negative electrode active material layer contains at least a negative electrode material (negative electrode active material) capable of occluding and releasing lithium, and may further contain a negative electrode binder, a negative electrode conductive agent, or the like.

The negative electrode material contains, for example, a carbon material. This is because a change in the crystal structure during occlusion and release of lithium is very small and thus a high energy density can be stably obtained. In addition, a carbon material functions also as a negative electrode conductive agent, so that the conductivity of the negative electrode active material layer is improved.

The carbon material is easily graphitizable carbon, hardly graphitizable carbon, graphite, low crystalline carbon, or amorphous carbon. The shape of the carbon material is a fibrous shape, a spherical shape, a granular shape, or a scaly shape.

In addition, the negative electrode material may contain, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element. Examples thereof include silicon oxide ($SiO_x$ ($0<x\leq 2$)), silicon carbide (SiC) or an alloy of carbon and silicon, and lithium titanate ($Li_4Ti_5O_{12}$).

In addition, the negative electrode material preferably contains a silicon-containing compound, such as silicon oxide and a silicon alloy, or a simple substance of silicon for the purpose of increasing the capacity. For example, the content of silicon oxide contained in the negative electrode active material layer is preferably 5 wt % or more and 20 wt % or less. This is because when the content is excessively low, the effect of increasing the capacity is not acquired, whereas when the content is excessively high, silicon expands to impair battery characteristics. The same applies also to the content of a silicon alloy or a simple substance of silicon.

In the lithium ion battery 1, when the open circuit voltage (i.e., battery voltage) at full charge is 4.25 V or higher, the amount of lithium released per unit mass is larger as compared with the case where the open circuit voltage at full charge is low even when the same positive electrode active material is used. Thus, a high energy density is achieved.

The separator 23 is a porous film containing a resin, and may be a laminated film of two or more types of porous films. The resin is polypropylene, polyethylene, or the like.

The separator 23 has the porous film as a substrate layer, and may include a resin layer on one or both sides thereof. This is because the adhesion of the separator 23 to each of the positive electrode 21 and the negative electrode 22 is improved and thus a distortion of the electrode wound body 20 is controlled.

The resin layer contains a resin such as PVdF. When this resin layer is formed, a solution in which the resin is dissolved in an organic solvent is applied to the substrate layer, and then the substrate layer is dried. Alternatively, the substrate layer may be immersed in the solution and then dried. It is preferable that the resin layer contains inorganic particles or organic particles from the viewpoint of improving heat resistance and battery safety. Examples of the kind of the inorganic particles include aluminum oxide, aluminum nitride, aluminum hydroxide, magnesium hydroxide, boehmite, talc, silica, and mica. Alternatively, a surface layer containing inorganic particles as a main component, which is formed by a sputtering method, an atomic layer deposition (ALD) method, or the like, may be employed instead of the resin layer.

The electrolyte solution contains a solvent and an electrolyte salt, and may further contain additives and the like, as necessary. The solvent is a nonaqueous solvent such as an organic solvent, or water. An electrolytic solution containing a nonaqueous solvent is called a nonaqueous electrolytic solution. The nonaqueous solvent is a cyclic carbonate ester, a chain carbonate ester, a lactone, a chain carboxylic acid ester, nitrile (mononitrile), or the like.

A typical example of the electrolyte salt is a lithium salt, and a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). Mixtures of these salts may also be used, and especially, it is preferable to use a mixture of $LiPF_6$ and $LiBF_4$ from the viewpoint of improving battery characteristics. The content of the electrolyte salt is not particularly limited, and is preferably 0.3 mol/kg to 3 mol/kg with respect to the solvent.

Next, a method of manufacturing the secondary battery will be described. In the preparation of a positive electrode 21, a positive electrode mixture is first prepared by mixing a positive electrode active material, a positive electrode binder, and a positive electrode conductive agent. Subsequently, the positive electrode mixture is dispersed in an organic solvent to prepare a positive electrode mixture slurry in a paste form. Subsequently, the positive electrode mixture slurry is applied to both sides of a positive electrode foil and then dried to form a positive electrode active material layer. Subsequently, the positive electrode active material layer is compression-molded using a roll pressing machine while the positive electrode active material layer is heated, thereby affording a positive electrode 21.

Also in the preparation of a negative electrode 22, the same procedure as that for the positive electrode 21 described above is performed.

Next, a positive electrode lead 25 and a negative electrode lead 26 are connected to a positive electrode foil and a negative electrode foil, respectively, by using a welding method. Subsequently, the positive electrode 21 and the negative electrode 22 are stacked with the separator 23 interposed therebetween, and then they are wound and a fixing tape is attached to an outermost peripheral surface of the separator 23 to form an electrode wound body 20.

Subsequently, the electrode wound body 20 is put into a battery can 11 with an insulator being in contact with the electrode wound body 20 on a side where a negative electrode lead 26 is exposed, and a can bottom is connected to the negative electrode lead 26 using the welding method. Next, an insulator is placed also on the electrode wound body 20 on a side where a positive electrode lead 25 is exposed, and one end of the positive electrode lead 25 is connected to a safety valve mechanism 30 using the welding method.

Subsequently, the battery can 11 is processed by using a beading processing machine (grooving processing machine) to form a recess in the battery can 11. Subsequently, an electrolytic solution is poured into the battery can 11 to impregnate the electrode wound body 20 therewith.

Subsequently, a battery lid 14 and the safety valve mechanism 30 are put into the battery can 11 together with a gasket 15.

Finally, as illustrated in FIG. 1, the battery lid 14 and the safety valve mechanism 30 are crimped with the gasket 15 interposed therebetween at the open end 11N of the battery can 11, thereby forming a crimped structure 11R.

EXAMPLES

Hereinafter, the present application will be described including based on examples regarding the internal resistance of the battery, and the rate of short circuit occurrence and the rate of buckling occurrence after a low temperature cycle test and a drop test using the battery 1 produced as described above according to an embodiment. The present application is not limited to Examples described below.

The battery size was set to 18650 (diameter: 18 mm, height: 65 mm), and the rated capacity was set to 3000 mAh. The material of the positive electrode foil 21A was Al and the thickness was set to 0.015 mm. The material of the negative electrode foil 22A was Cu and the thickness was set to 0.015 mm. The separator 23 was a biaxially drawn polyethylene and had a thickness of 0.010 mm. In all Examples and Comparative Examples, negative electrode active materials contain carbon and silicon. Specifically, the negative electrode active materials contained carbon as a main material, and in Examples and Comparative Examples, the content of silicon oxide was set to 15 wt %.

The positive electrode foil tab 35 and the like shown in the following correspond to the positive electrode lead 25 in FIG. 1 and the negative electrode tab 52 and the like correspond to the negative electrode lead 26 in FIG. 1. In Examples and Comparative Examples, in some cases, there are foil tabs 31, 32 on the winding starting side of the positive electrode and the negative electrode in addition to the foil tab 35 and the tab 52 located between the winding starting side and the winding ending side of the positive electrode and the negative electrode. In the following, a description is made with reference to the foil tab 35 of the positive electrode and the foil tab 32 of the negative electrode as examples.

In the following, a region where the surface of the positive electrode foil 21A is covered with a positive electrode active material layer is called an active material covered portion 21B of the positive electrode, and a region where the surface is not covered is called an active material non-covered portion 21C of the positive electrode.

In addition, a region where the surface of the negative electrode foil 22A is covered with a negative electrode active material layer is called an active material covered portion 22B of the negative electrode, and a region where the surface is not covered is called an active material non-covered portion 22C of the negative electrode.

Figure 2:
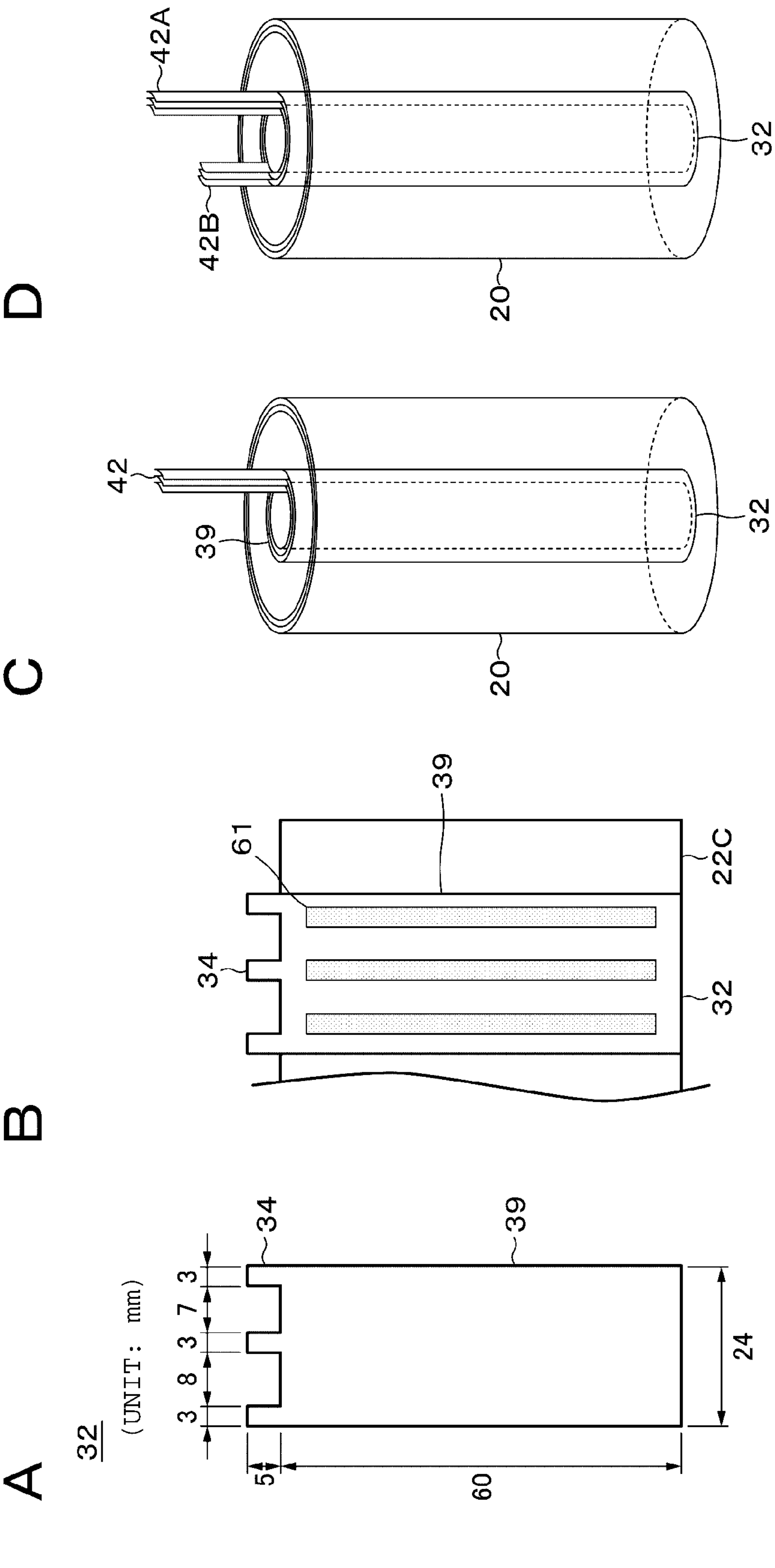
FIG. 2 includes views A to D that are diagrams for illustrating an example of a foil tab.
Figure 3:
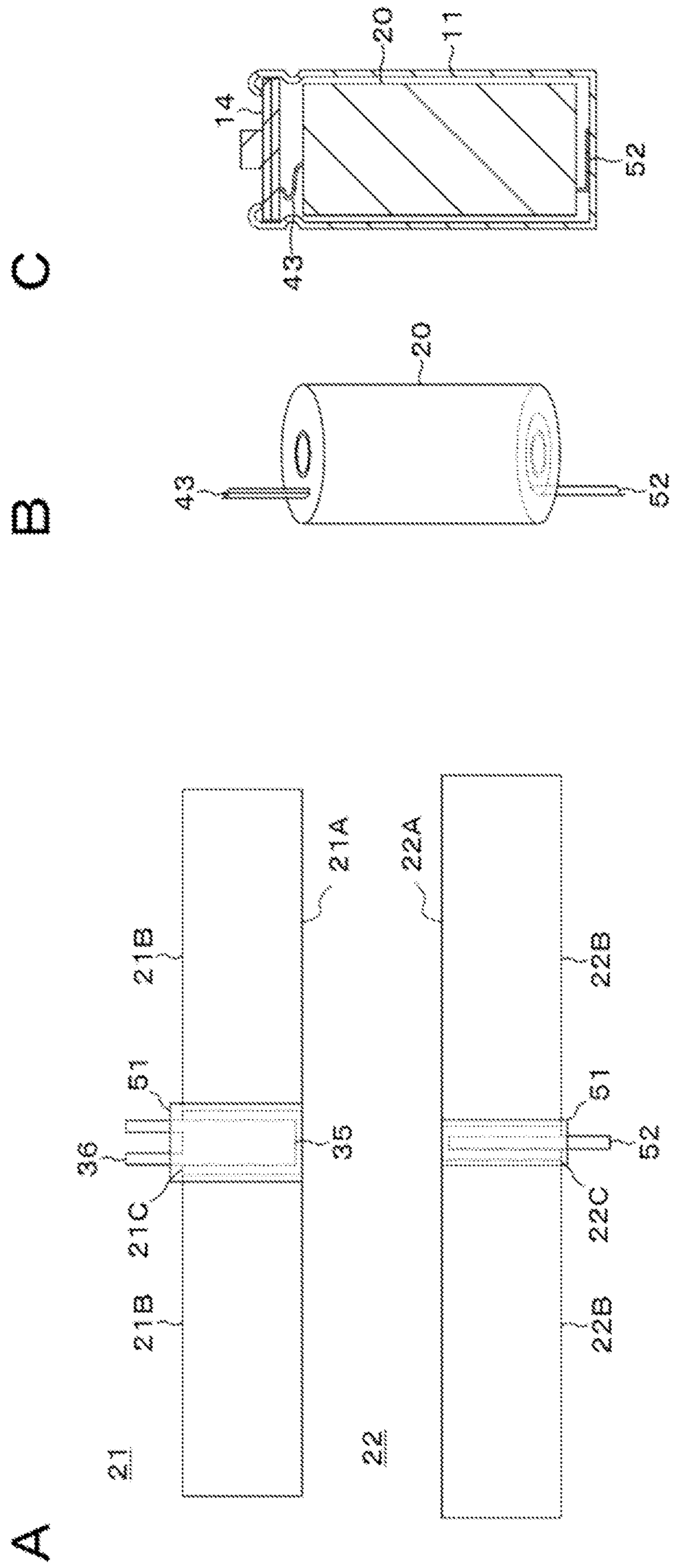
FIG. 3 includes views A to C that are diagrams for illustrating Example 1.
Figure 4:
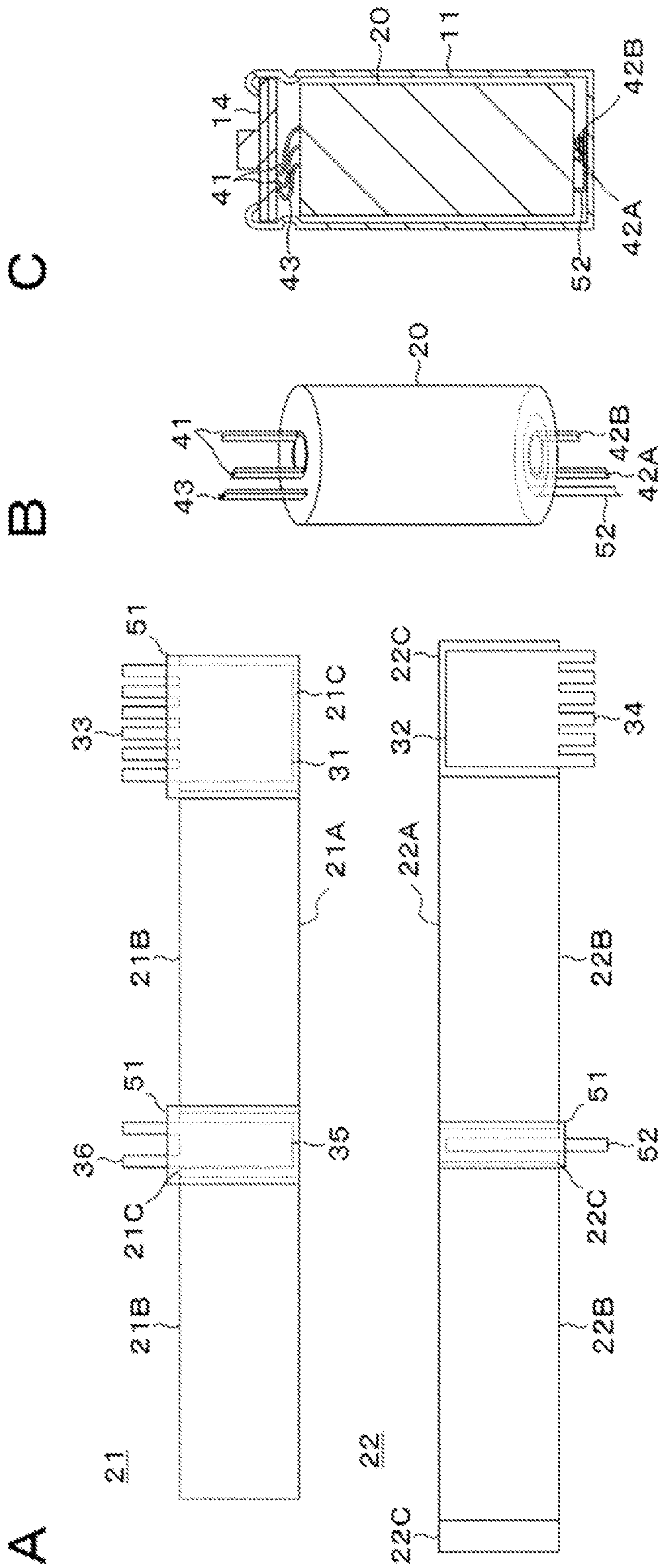
FIG. 4 includes views A to C that are diagrams for illustrating Example 2.
Figure 5:
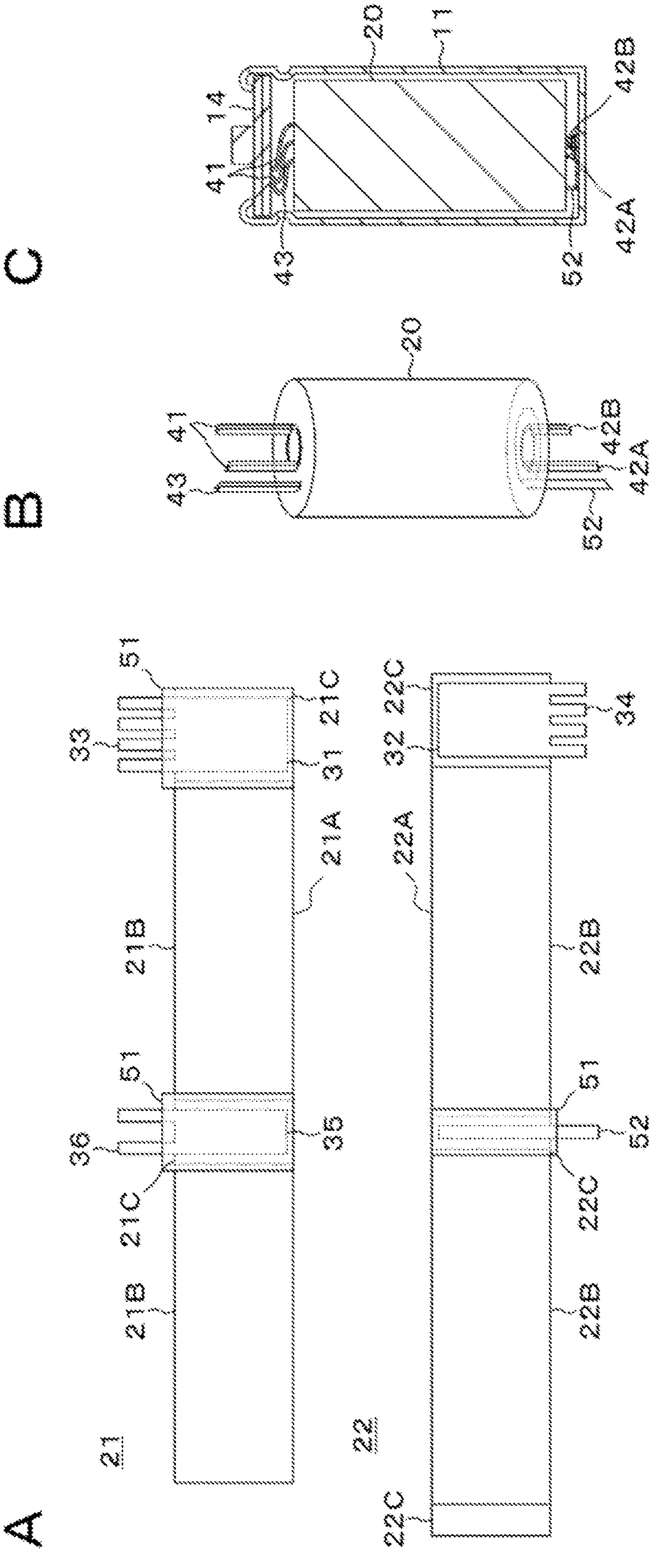
FIG. 5 includes views A to C that are diagrams for illustrating Example 3.
Figure 6:
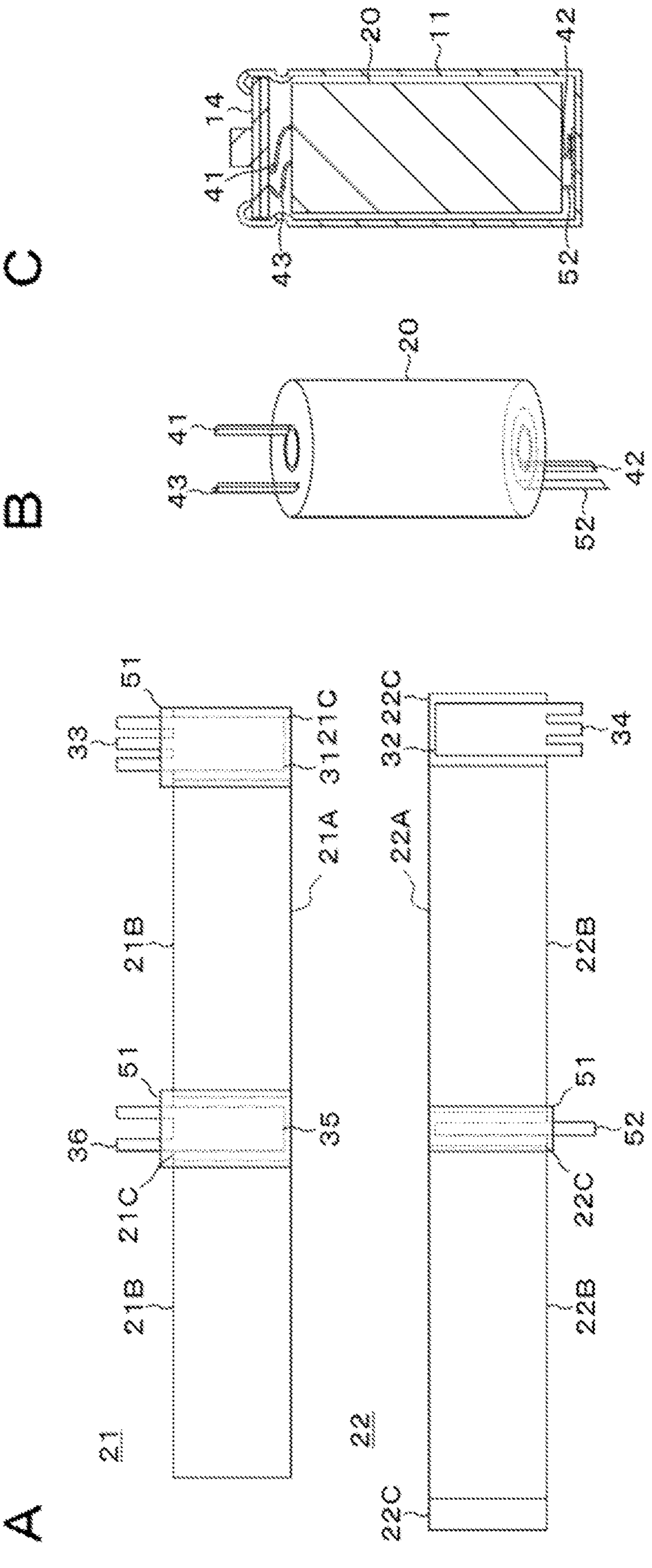
FIG. 6 includes views A to C that are diagrams for illustrating Example 4.
Figure 7:
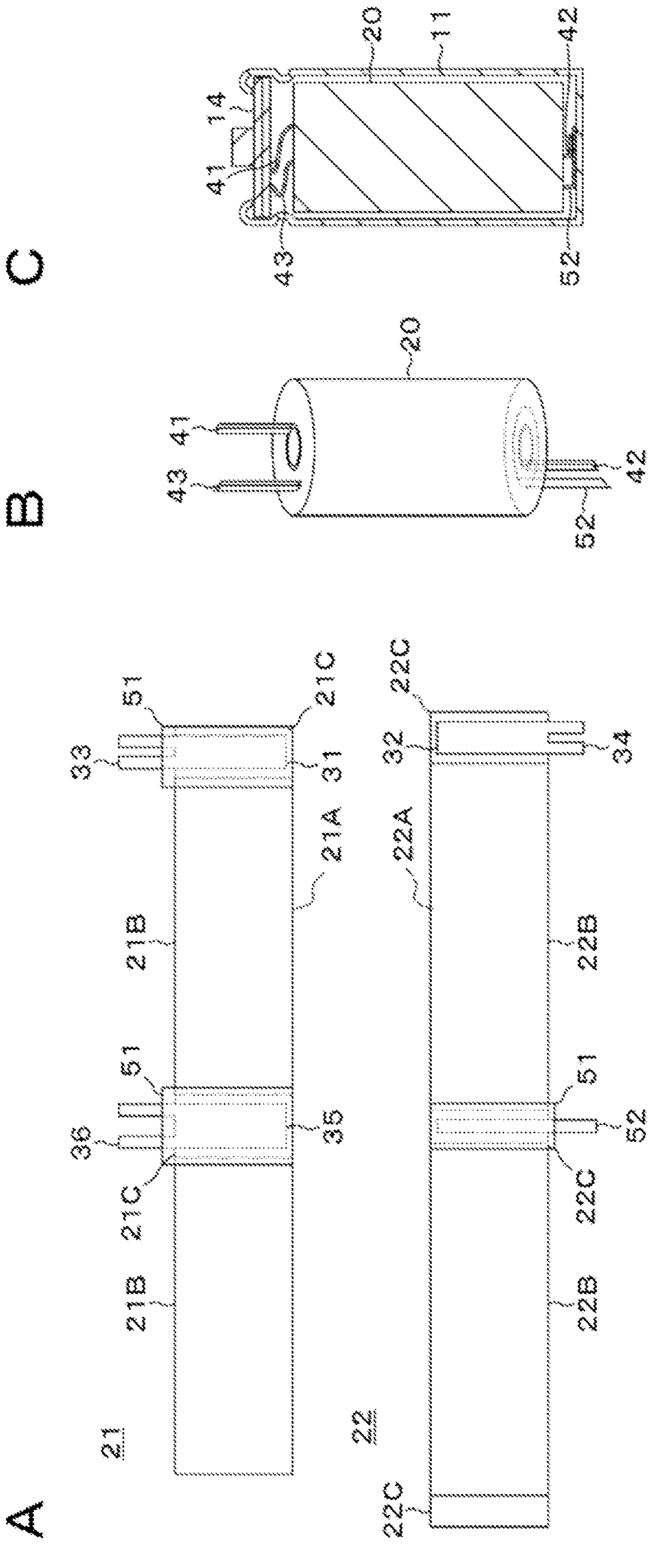
FIG. 7 includes views A to C that are diagrams for illustrating Example 5.
Figure 8:
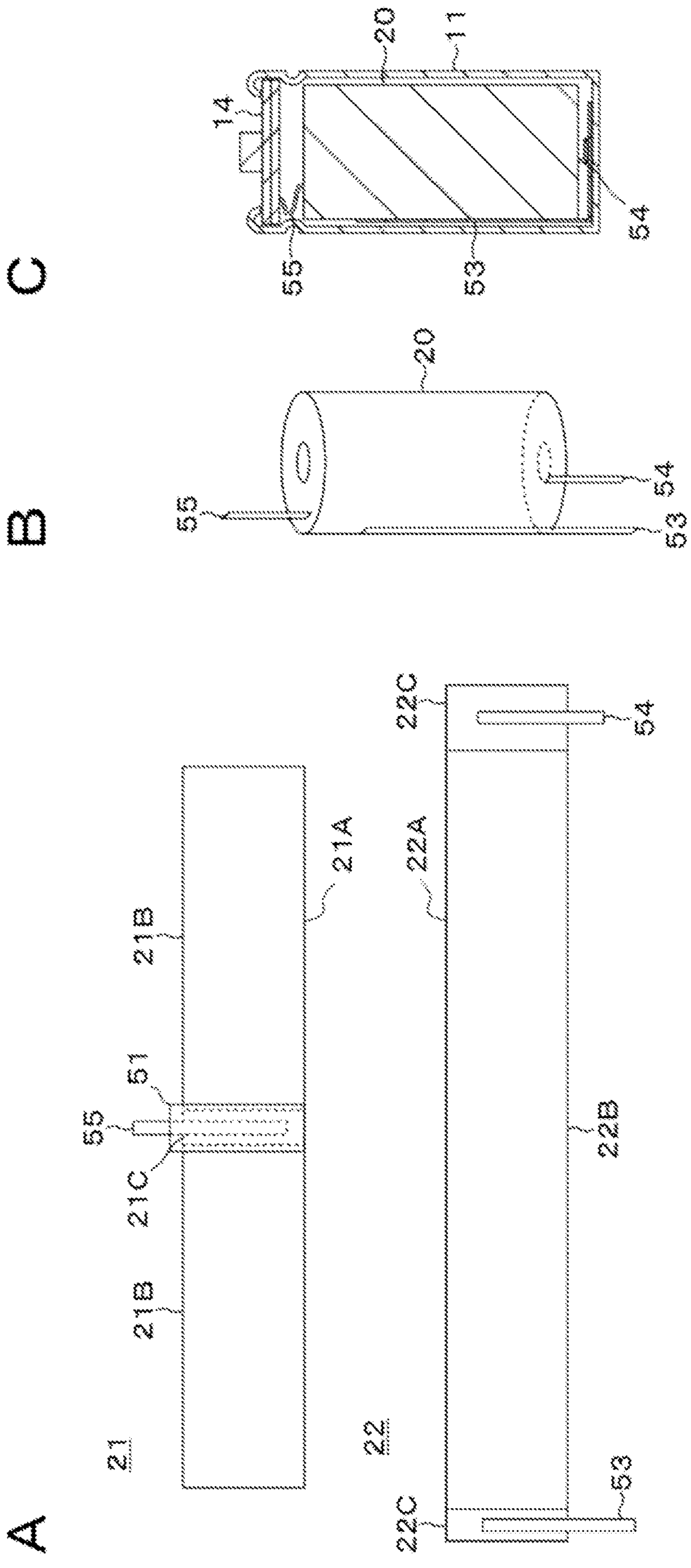
FIG. 8 includes views A to C that are diagrams for illustrating Comparative Example 1.

For the purpose of basic understanding of the foil tab 35 of the positive electrode, the foil tabs 31, 32 are explained below. The positive electrode 21 or the negative electrode 22 has the foil tab 31 of the positive electrode or the foil tab 32 of the negative electrode on the winding starting side. For example, as illustrated in FIG. 2A, the foil tab 32 of the negative electrode has a flat plate-like shape and is composed of a plate-like part 39 and a comb-like part 34. The plate-like part 39 of the foil tab 32 has a width of 24 mm, which is larger than that of conventional tabs, and has a role of current collection from the negative electrode 22. The foil tab 32 has the comb-like part 34 on an end thereof.

FIG. 2A to FIG. 2D show examples of the structure of the foil tab 32 and examples of the foil tab 32 wound together with the negative electrode 22. In FIG. 2A, the comb-like part 34 is in a comb-like shape with band-shaped projections each having a width of 3 mm and a length of 5 mm. The intervals between the band-shaped projections of the comb-like part 34 of FIG. 2A are 7 mm and 8 mm taken from the winding starting side and are not a single fixed value. The intervals between the band-shaped projections of the comb-like part 34 are designed such that the widths of the band-shaped projections overlapping with a round delay at the time of winding overlap within almost ±1 mm and are gradually increase from the winding starting side so as not to cause problems at the time of welding with a can bottom or a safety valve. The intervals between the band-shaped projections of the foil tab 32 are set to gradually increase from the winding starting side such that the band-shaped projections of the comb-like part 34 form a single united shape when the foil tab 32 is wound. As illustrated in FIG. 2B, for example, the plate-like part 39 of the foil tab 32 of the negative electrode is joined to the active material non-covered portion 22C of the negative electrode, which is the winding starting side of the negative electrode 22, at three welding areas 61 (parts provided with a dot pattern in the drawing). At this time, the foil tab 32 is disposed such that the comb-like part 34 protrudes from the negative electrode 22. Also in the case of the foil tab 31 of the positive electrode, the same configuration as that of the foil tab 32 of the negative electrode can be adopted.

The foil tab 32 is wound with the negative electrode 22, and as illustrated in FIG. 2C, the comb-like part 34 of the foil tab 32 is superposed with one round interval and united at one site, so that a single connecting part 42 of the foil tab 32 is formed. The connecting part 42 is joined with the can bottom of the battery can 11. The comb-like part 34 of the foil tab 32 of FIG. 2A and FIG. 2B has three band-shaped projections, and in FIG. 2C, the plate-like part 39 of the foil tab 32 is wound two rounds and the connecting part 42 has a structure in which three band-shaped projections are superposed. The foil tab 32 wound is a reinforcement for the inner peripheral portion of the electrode wound body 20 and can prevent the buckling or deformation of the inner peripheral portion of the electrode wound body 20 at the time of charge and discharge of the battery 1.

The comb-like part of the foil tab 32 of the negative electrode may be separated into a plurality of comb-like parts 34, for example, four or six or more parts. In this case, as illustrated in FIG. 2D, when the foil tab 32 is wound, the comb-like parts 34 thereof are superposed unitedly at two positions to form two facing connecting parts 42A and 42B. In this case, in the comb-like part 34 of the foil tab 32 of the negative electrode, relatively long band-shaped projections and relatively short band-shaped projections are arranged alternately (not shown), and when wound, the long band-shaped projections are superposed together and the short band-shaped projections are superposed together, so that, as shown in FIG. 2D, a relatively long connecting part 42A and a relatively short connecting part 42B are formed in the foil tab 32. When the two connecting parts 42A and 42B is varied in length, they can be folded to weld with the can bottom.

The foil tab 31 of the positive electrode is the same in shape as the foil tab 32 of the negative electrode, but differs in that the length of the comb-like part 33 is relatively large. In a similar manner, the comb-like part 33 protrudes from the positive electrode 21 and is wound with the positive electrode 21, so that a plurality of band-shaped projections is united into one or two connecting parts 41. When there are two connecting parts 41, the two connecting parts 41 have no special difference in length. The plate-like part of the foil tab 31 is joined by welding at the active material non-covered portion 21C of the positive electrode on the winding starting side of the positive electrode. The foil tab 31 wound is a reinforcement for the inner peripheral portion of the electrode wound body 20 and can prevent the buckling or deformation of the inner peripheral portion of the electrode wound body 20 at the time of charge and discharge of the battery 1.

Due to the requirement that the foil tabs 31 and 32 are required to have a thickness as a reinforcement for the inner peripheral portion of the electrode wound body 20 and limitations regarding the structure in the battery can 11, the thickness of the foil tabs 31 and 32 is preferably 0.020 mm or more and 0.100 mm or less. More preferably, the thickness of the foil tabs 31 and 32 is 0.030 mm or more and 0.080 mm or less. The material of the foil tab 32 of the negative electrode is preferably any one of copper, a copper-nickel alloy, nickel, zinc, a copper-zinc alloy and a copper-zinc-nickel alloy or a composite material thereof. In addition, the number of winding of the foil tab 32 is preferably 1 round or more and 4 rounds or less.

Examples of the materials of the foil tab 31 of the positive electrode include aluminum, titanium, and stainless steel (SUS). SUS304 dissolves after heat aging in a 4.2V system in which an LCO positive electrode or an NCA positive electrode is used, but does not dissolve in a 3.6V system in which a $LiFePO_4$ positive electrode and the like are used. SUS316 does not dissolve after heat aging also in a 4.2V system in which an LCO positive electrode or an NCA positive electrode is used. Thus, as to SUS, a material may be used with appropriate choice according to the battery voltage.

The positive electrode 21 of the Example described below has a foil tab 35 of the positive electrode between the winding starting side and the winding ending side. For example, the foil tab 35 of the positive electrode has a flat plate-like shape and is composed of a plate-like part and a comb-like part 36. The plate-like part of the foil tab 35 is larger in width as compared with conventional tabs and has a role of current collection from the positive electrode. The foil tab 35 has a comb-like part 36 composed of two band-shaped projections at an end.

The comb-like part 36 of the foil tab 35 is in a comb-like shape with band-shaped projections each having a width of 6 mm and a length of 7 mm. The interval between two band-shaped projections is about 20 mm, and the foil tab 35 is designed such that the band-shaped projections of the comb-like part 36 form a single united shape when the foil tab 35 is wound with the positive electrode 21. The plate-like part of the foil tab 35 of the positive electrode is joined by welding to the active material non-covered portion 21C of the positive electrode, which is an approximately middle position of the positive electrode 21. At this time, the foil tab 35 is disposed such that the comb-like part 36 protrudes from the positive electrode 21. As the material of the foil tab 35 of the positive electrode, the same materials as those for the foil tab 31 can be used. The thickness of the foil tab 35 is preferably 0.020 mm or more and 0.100 mm or less. More preferably, the thickness of the foil tab 35 is 0.030 mm and 0.080 mm or less.

The foil tab 35 is wound with the positive electrode 21, and band-shaped projections of the comb-like part 36 of the foil tab 35 is superposed with one round interval and united at one site, so that a single connecting part 43 of the foil tab 35 is formed. The connecting part 43 is joined with the safety valve mechanism 30. The comb-like part 36 of the foil tab 35 has two band-shaped projections, and the plate-like part of the foil tab 35 is wound one round and the connecting part 43 has a structure in which two band-shaped projections are superposed. The foil tab 35 wound is a reinforcement for the inner peripheral portion of the electrode wound body 20 and can prevent the buckling or deformation of the inner peripheral portion of the electrode wound body 20 at the time of charge and discharge of the battery 1.

The thickness of the foil tab 35 located at an approximately middle position of the positive electrode 21 was set to 0.05 mm, the width of the band-shaped projections of the comb-like part 36 was set to 6 mm, and the material was Al. The foil tab 35 located at the approximately middle position of the positive electrode 21 and the active material non-covered portion 21C of the positive electrode to which the foil tab 35 was joined were covered with an insulating tape 51. The tab 52 located at an approximately middle position of the negative electrode 22 was set to 0.08 mm in thickness and 3 mm in width, and was made of Cu. The tab 52 located at an approximately middle position of the negative electrode 22 and the active material non-covered portion 22C of the negative electrode to which the tab 52 was joined were covered with an insulating tape 51.

Further, in Example 2 to Example 5, the thickness of the foil tab 31 located on the winding starting side of the positive electrode 21 was set to 0.05 mm, the width of the band-shaped projections of the comb-like part 33 was set to 3 mm, and the material was Al. The foil tab 31 located on the winding starting side of the positive electrode 21 and the active material non-covered portion 21C of the positive electrode to which the foil tab 31 was joined were covered with an insulating tape 51. The thickness of the foil tab 32 located on the winding starting side of the negative electrode 22 was set to 0.04 mm, the width of the band-shaped projections of the comb-like part 34 was set to 3 mm, and the material was Cu.

In Comparative Example 1, the thickness of the tab 55 located at an approximately middle position of the positive electrode 21 was set to 0.1 mm, the width was set to 6 mm, and the material was Al. The thickness of the tab 54 located on the winding starting side of the negative electrode 22 was set to 0.08 mm, the width was set to 3 mm, and the material was CuNi. The thickness of the tab 53 located on the winding ending side of the negative electrode 22 was set to 0.08 mm, the width was set to 3 mm, and the material was CuNi.

The thickness of the tabs 52, 53, 54 and 55, the thickness of the foil tab 35, and the thickness of the foil tabs 31 and 32 were measured using a micrometer (MDC-25 MX manufactured by Mitutoyo Corporation).

Referring to FIG. 3A to FIG. 8A (A in each of FIG. 3 to FIG. 8), in the upper side of each drawing is shown a schematic diagram of a positive electrode 21 before winding, in the lower side of each drawing is shown a schematic diagram of a negative electrode 22 before winding. The right side of each drawing is the winding starting side, and the left side of each drawing is the winding ending side. FIG. 3B to FIG. 8B (B in each of FIG. 3 to FIG. 8) show schematic diagrams of electrode wound bodies 20 resulting from winding the positive electrodes 21 and the negative electrodes 22 of FIG. 3A to FIG. 8A together with separators 23, respectively. The upper side of each drawing is the battery lid 14 side, and the lower side of each drawing is the can bottom side of a battery can 11. FIG. 3C to FIG. 8C (C in each of FIG. 3 to FIG. 8) are schematic diagrams of batteries 1 fabricated by putting the electrode wound bodies 20 of FIG. 3B to FIG. 8B in battery cans 11, respectively.

Example 1

As illustrated in FIG. 3A, a foil tab 35 was disposed at an approximately middle position of a positive electrode 21, and a tab 52 was disposed at an approximately middle position of a negative electrode 22. A comb-like part 36 of the foil tab 35 was composed of two band-shaped projections. As illustrated in FIG. 3B, the positive electrode 21 and the negative electrode 22 were stacked with a separator 23 interposed therebetween, and these were wound such that the two band-shaped projections of the comb-like part 36 were superposed and united into one connecting part 43. The number of winding of the tab 52 of the negative electrode was set to 1 round. The material of the foil tab 35 was Al and the material of the tab 52 was Cu. As illustrated in FIG. 3C, an electrode wound body 20 to which the foil tab 35 and the tab 52 were joined was put in a battery can 11. The content of silicon oxide contained in the negative electrode active material was set to 15 wt %.

Example 2

As illustrated in FIG. 4A, a foil tab 35 was disposed at an approximately middle position of a positive electrode 21, and a foil tab 31 was disposed on the winding starting side of the positive electrode 21. A comb-like part 36 of the foil tab 35 was composed of two band-shaped projections, and a comb-like part 33 of the foil tab 31 was composed of six band-shaped projections. A tab 52 was disposed at an approximately middle position of a negative electrode 22, and a foil tab 32 was disposed on the winding starting side of the negative electrode 22. A comb-like part 34 of the foil tab 32 was composed of six band-shaped projections. As illustrated in FIG. 4B, the positive electrode 21 and the negative electrode 22 were stacked with a separator 23 interposed therebetween, and these were wound such that the two band-shaped projections of the comb-like part 36 of the foil tab 35 were superposed and united into one connecting part 43. The number of winding of the foil tab 35 of the positive electrode was set to 1 round. Further, the foil tab 31 and the foil tab 32 were each wound such that the six band-shaped projections of the comb-like parts 33, 34 were superposed alternately and united into two connecting parts 41, 41 and two connecting parts 42A, 42B. The number of winding of the foil tab 31 of the positive electrode was set to 2.5 rounds, and the number of winding of the foil tab 32 of the negative electrode was set to 2.5 rounds. As illustrated in FIG. 4C, an electrode wound body 20 to which the foil tab 35, the tab 52 and the foil tabs 31, 32 were joined was put in a battery can 11. The content of silicon oxide contained in the negative electrode active material was set to 15 wt %.

Example 3

As illustrated in FIG. 5A, a foil tab 35 was disposed at an approximately middle position of a positive electrode 21, and a foil tab 31 was disposed on the winding starting side of the positive electrode 21. A comb-like part 36 of the foil tab 35 was composed of two band-shaped projections, and a comb-like part 33 of the foil tab 31 was composed of four band-shaped projections. A tab 52 was disposed at an approximately middle position of a negative electrode 22, and a foil tab 32 was disposed on the winding starting side of the negative electrode 22. A comb-like part 34 of the foil tab 32 was composed of four band-shaped projections. As illustrated in FIG. 5B, the positive electrode 21 and the negative electrode 22 were stacked with a separator 23 interposed therebetween, and these were wound such that the two band-shaped projections of the comb-like part 36 of the foil tab 35 were superposed and united into one connecting part 43. The number of winding of the foil tab 35 of the positive electrode was set to 1 round. Further, the foil tab 31 and the foil tab 32 were each wound such that the four band-shaped projections of the comb-like parts 33, 34 were superposed alternately and united into two connecting parts 41, 41 and two connecting parts 42A, 42B. The number of winding of the foil tab 31 of the positive electrode was set to 1.5 rounds, and the number of winding of the foil tab 32 of the negative electrode was set to 1.5 rounds. As illustrated in FIG. 5C, an electrode wound body 20 to which the foil tab 35, the tab 52 and the foil tabs 31, 32 were joined was put in a battery can 11. The content of silicon oxide contained in the negative electrode active material was set to 15 wt %.

Example 4

As illustrated in FIG. 6A, a foil tab 35 was disposed at an approximately middle position of a positive electrode 21, and a foil tab 31 was disposed on the winding starting side of the positive electrode 21. A comb-like part 36 of the foil tab 35 was composed of two band-shaped projections, and a comb-like part 33 of the foil tab 31 was composed of three band-shaped projections. A tab 52 was disposed at an approximately middle position of a negative electrode 22, and a foil tab 32 was disposed on the winding starting side of the negative electrode 22. A comb-like part 34 of the foil tab 32 was composed of three band-shaped projections. As illustrated in FIG. 6B, the positive electrode 21 and the negative electrode 22 were stacked with a separator 23 interposed therebetween, and these were wound such that the two band-shaped projections of the comb-like part 36 of the foil tab 35 were superposed and united into one connecting part 43. The number of winding of the foil tab 35 of the positive electrode was set to 1 round. Further, the foil tab 31 and the foil tab 32 were each wound such that the three band-shaped projections of the comb-like parts 33, 34 were superposed together and united into one connecting part 41 and one connecting part 42. The number of winding of the foil tab 31 of the positive electrode was set to 2 rounds, and the number of winding of the foil tab 32 of the negative electrode was set to 2 rounds. As illustrated in FIG. 6C, an electrode wound body 20 to which the foil tab 35, the tab 52 and the foil tabs 31, 32 were joined was put in a battery can 11. The content of silicon oxide contained in the negative electrode active material was set to 15 wt %.

Example 5

As illustrated in FIG. 7A, a foil tab 35 was disposed at an approximately middle position of a positive electrode 21, and a foil tab 31 was disposed on the winding starting side of the positive electrode 21. A comb-like part 36 of the foil tab 35 was composed of two band-shaped projections, and a comb-like part 33 of the foil tab 31 was composed of two band-shaped projections. A tab 52 was disposed at an approximately middle position of a negative electrode 22, and a foil tab 32 was disposed on the winding starting side of the negative electrode 22. A comb-like part 34 of the foil tab 32 was composed of two band-shaped projections. As illustrated in FIG. 7B, the positive electrode 21 and the negative electrode 22 were stacked with a separator 23 interposed therebetween, and these were wound such that the two band-shaped projections of the comb-like part 36 of the foil tab 35 were superposed and united into one connecting part 43. The number of winding of the foil tab 35 of the positive electrode was set to 1 round. Further, the foil tab 31 and the foil tab 32 were each wound such that the two band-shaped projections of the comb-like parts 33, 34 were superposed together and united into one connecting part 41 and one connecting part 42. The number of winding of the foil tab 31 of the positive electrode was set to 1 round, and the number of winding of the foil tab 32 of the negative electrode was set to 1 round. As illustrated in FIG. 7C, an electrode wound body 20 to which the foil tab 35, the tab 52 and the foil tabs 31, 32 were joined was put in a battery can 11. The content of silicon oxide contained in the negative electrode active material was set to 15 wt %.

Comparative Example 1

As illustrated in FIG. 8A, a tab 55 was disposed at an approximately middle position of a positive electrode 21, a tab 54 was disposed on the winding starting side of the negative electrode 22, and a tab 53 was disposed on the winding ending side of the negative electrode 22. As illustrated in FIG. 8B, the positive electrode 21 and the negative electrode 22 were stacked with a separator 23 interposed therebetween, and these were wound. As illustrated in FIG. 8C, an electrode wound body 20 to which the tabs 53, 54 and 55 were joined was put in a battery can 11. The content of silicon oxide contained in the negative electrode active material was set to 15 wt %.

For the batteries 1 of the examples described above, an internal resistance of each battery was measured, a rate of short circuit occurrence was determined by conducting a drop test after a low temperature cycle test, a rate of buckling occurrence was determined by conducting CT scanning, and based on these results, an overall rating was performed. The internal resistance of a battery, the low temperature cycle test, the drop test, and the CT scanning are as follows.

<Internal Resistance of Battery>

The internal resistance of a battery was determined based on the result of AC impedance measurement at a frequency of 1 kHz.

<Low Temperature Cycle Test>

Environmental temperature: 0° C.

Charge: CC/AC, 4.25 V/1 C, 100 mAcut

Discharge: 2 C, 2Vcut (Charging was restarted when the cell temperature reached 0° C. after discharging.)

The number of cycles: the number of cycles of continuation until the capacity retention ratio finally arrives at 30% at a low rate (0.5 C) when discharge rate is reduced in steps with reference to the arrival of the capacity retention ratio at 30%.

When the retention ratio based on the initial discharge capacity reached 30% or less, the discharge rate was reduced to 1 C, and then the discharge rate was reduced to 0.5 C when likewise the retention ratio reached 30% or less, and the test was performed to 30% or less.

<Drop Test>

A part of the test defined in "Guideline for safety assessment of lithium secondary batteries" (SBA G1101) was modified. Specifically, although the drop test defined in SBA G1101 is a test in which a sample is dropped 10 times onto concrete from a height of 1.9 m, in the drop test of the present evaluation, a test was performed with 20 droppings, and the probability of short circuit occurrence at n=10 was determined.

<CT Scanning>

After a drop test following a low temperature cycle, an inner peripheral portion of an electrode wound body was observed using an X-ray CT scanner, and the proportion of batteries buckled was taken as a rate of buckling occurrence. The number of tests was set to 10.

TABLE 1

| | Content (wt %) of silicon oxide in negative electrode active material | Winding starting side of positive electrode: Number of band-shaped projections of tab | Winding starting side of positive electrode: Number of connecting parts of tab | Winding starting side of positive electrode: Number of winding of tab (round) | Winding starting side of positive electrode: Number of band-shaped projections of foil tab | Winding starting side of positive electrode: Number of connecting parts of foil tab | Winding starting side of positive electrode: Number of winding of foil tab (round) | Winding starting side of negative electrode: Number of band-shaped projections of foil tab | Winding starting side of negative electrode: Number of connecting parts of foil tab | Winding starting side of negative electrode: Number of winding of foil tab (round) | Internal resistance of battery ACR (mΩ) | Rate of short circuit occurrence (%) | Rate of buckling occurrence (%) | Overall rating |
|---|---|---|---|---|---|---|---|---|---|---|---|---|---|---|
| Example 1 | 15 | 2 | 1 | 1 | — | — | — | — | — | — | 12.2 | 0 | 10 | OK |
| Example 2 | 15 | 2 | 1 | 1 | 6 | 2 | 2.5 | 6 | 2 | 2.5 | 8.5 | 0 | 0 | OK |
| Example 3 | 15 | 2 | 1 | 1 | 4 | 2 | 1.5 | 4 | 2 | 1.5 | 8.6 | 0 | 0 | OK |
| Example 4 | 15 | 2 | 1 | 1 | 3 | 1 | 2 | 3 | 1 | 2 | 8.6 | 0 | 0 | OK |
| Example 5 | 15 | 2 | 1 | 1 | 2 | 1 | 1 | 2 | 1 | 1 | 8.7 | 0 | 0 | OK |
| Comparative Example 1 | 15 | 1 | 1 | — | — | — | — | — | — | — | 12.2 | 50 | 100 | NG |

In Example 1 to Example 5, the rate of short circuit occurrence and the rate of buckling occurrence were 0% or 10% and the overall rating was OK, but in Comparative Example 1, these rates were high and the overall rating was NG. In particular, as in Example 2 to Example 5, when there were foil tabs on the winding starting side of the positive electrode 21 and on the winding starting side of the negative electrode, the internal resistance of the battery was lower as compared with Example 1 and Comparative Example 1 both having no foil tabs. In Example 1 to Example 5, the inner peripheral portion of the electrode wound body was not distorted and maintained in a perfect circle, whereas in Comparative Example 1, the inner peripheral portion of the electrode wound body was distorted and the perfect circle was not maintained. It can be judged based on Table 1 that when a foil tab 35 of a positive electrode is provided between the winding starting side and the winding ending side of the positive electrode (i.e., at an approximately middle position of the positive electrode), the foil tab 35 has a comb-like part 36 protruding from the positive electrode 21, and the comb-like part 36 is made to be a connecting part 43 of an electrode wound body 20, a battery 1 undergoes neither buckling nor internal short circuit even when the battery is charged and discharged repeatedly.

Modification Example

Although an embodiment of the present application has been described above, the contents of the present application are not limited to the above-described embodiment, and various modifications can be made.

In Modification Examples 5 to 8, a tab 56 was disposed at a position of about ⅓ the overall length from the winding starting side toward the winding ending side of the positive electrode 21, and the thickness of the tab 56 was set to 0.1 mm, the width was set to 5 mm, and the material was aluminum. The tab 56 located at an approximately middle position of the positive electrode 21 and the active material non-covered portion 21C of the positive electrode to which the tab 56 was joined were covered with an insulating tape 51. The thickness of the tab 56 was measured using a micrometer (MDC-25 MX manufactured by Mitutoyo Corporation). The foil tab 37 shown in Modification Examples is the same as the foil tab 35 except for the interval between the band-shaped projections of the comb-like part 38.

Referring to FIG. 9A to FIG. 16A (A in each of FIG. 9 to FIG. 16), in the upper side of each drawing is shown a schematic diagram of a positive electrode 21 before winding, in the lower side of each drawing is shown a schematic diagram of a negative electrode 22 before winding. The right side of each drawing is the winding starting side, and the left side of each drawing is the winding ending side. FIG. 9B to FIG. 16B (B in each of FIG. 9 to FIG. 16) show schematic diagrams of electrode wound bodies 20 resulting from winding the positive electrodes 21 and the negative electrodes 22 of FIG. 9A to FIG. 16A together with separators, respectively. The upper side of each drawing is the battery lid 14 side, and the lower side of each drawing is the can bottom side of a battery can 11. FIG. 9C to FIG. 16C (C in each of FIG. 9 to FIG. 16) are schematic diagrams of batteries 1 fabricated by putting the electrode wound bodies 20 of FIG. 9B to FIG. 16B in battery cans 11, respectively.

Modification Examples 1 to 4

Figure 9:
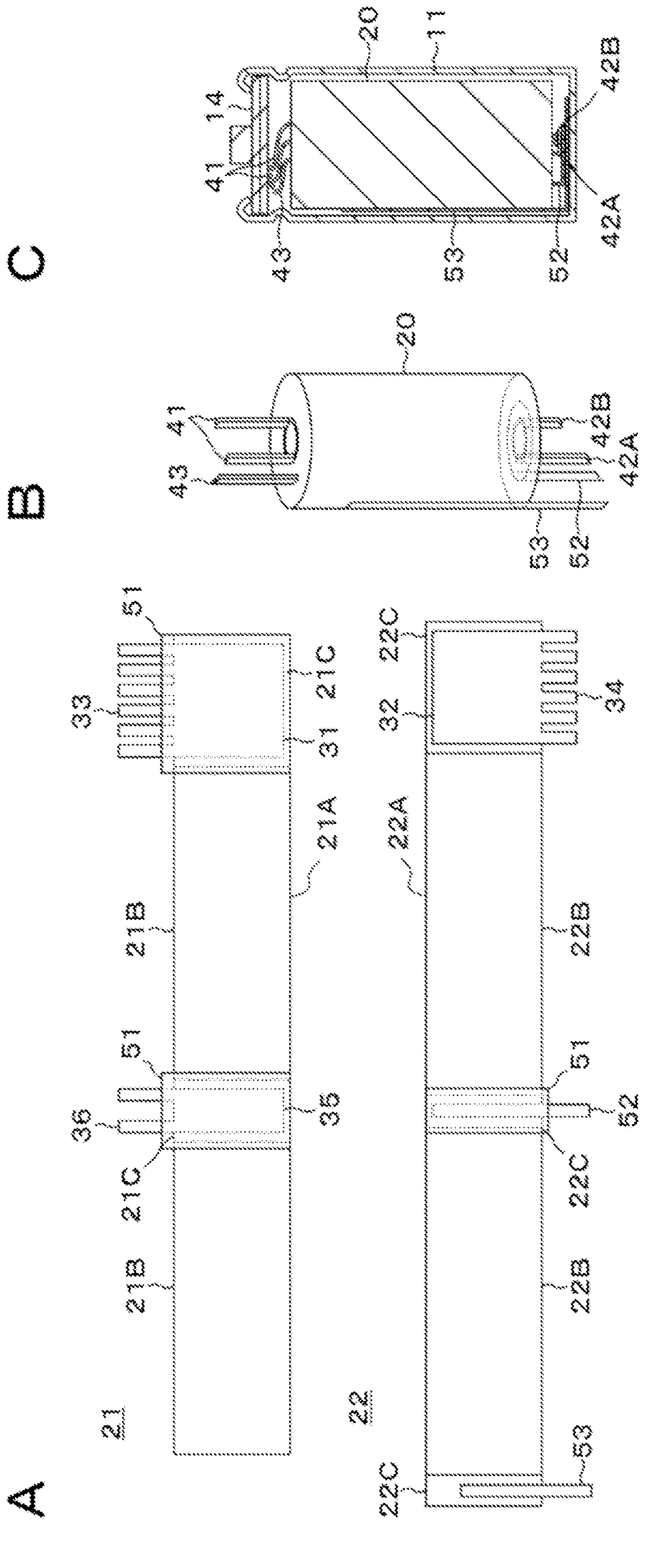
FIG. 9 includes views A to C that are diagrams for illustrating Modification Example 1.
Figure 10:
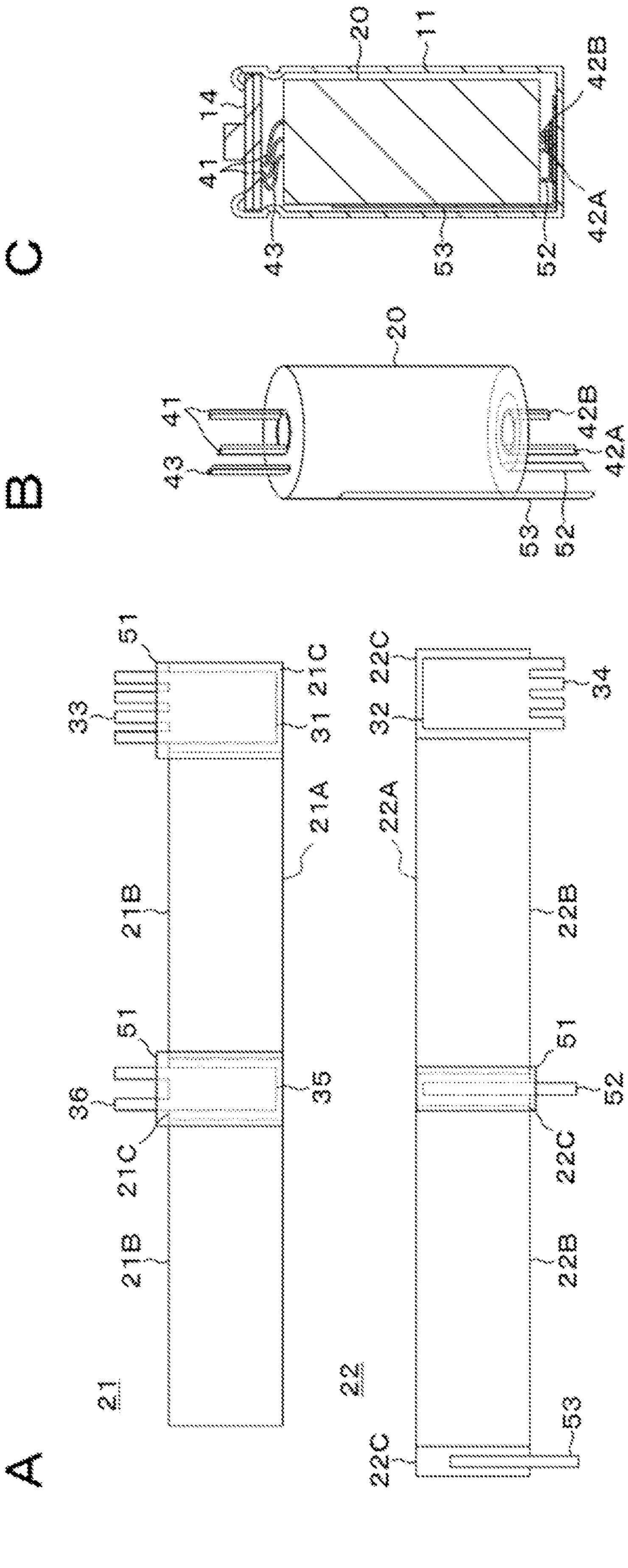
FIG. 10 includes views A to C that are diagrams for illustrating Modification Example 2.
Figure 11:
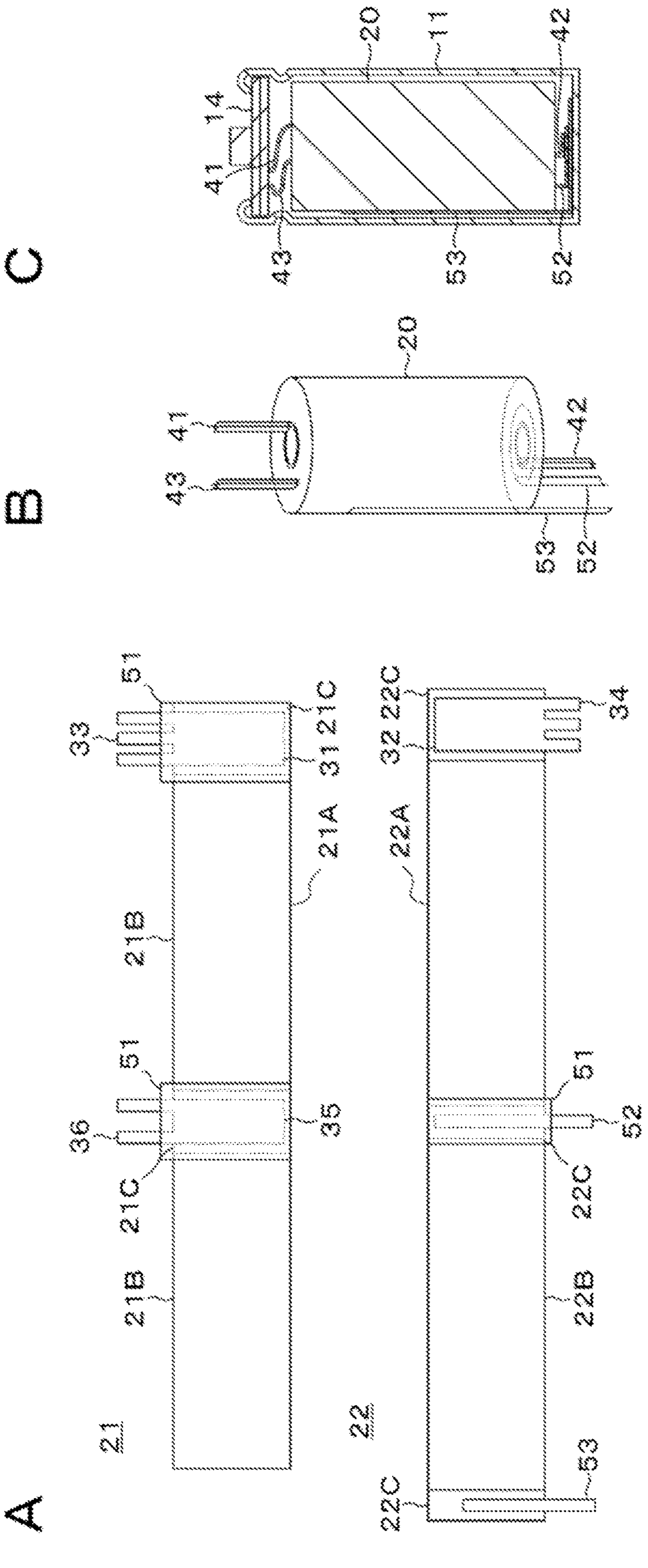
FIG. 11 includes views A to C that are diagrams for illustrating Modification Example 3.
Figure 12:
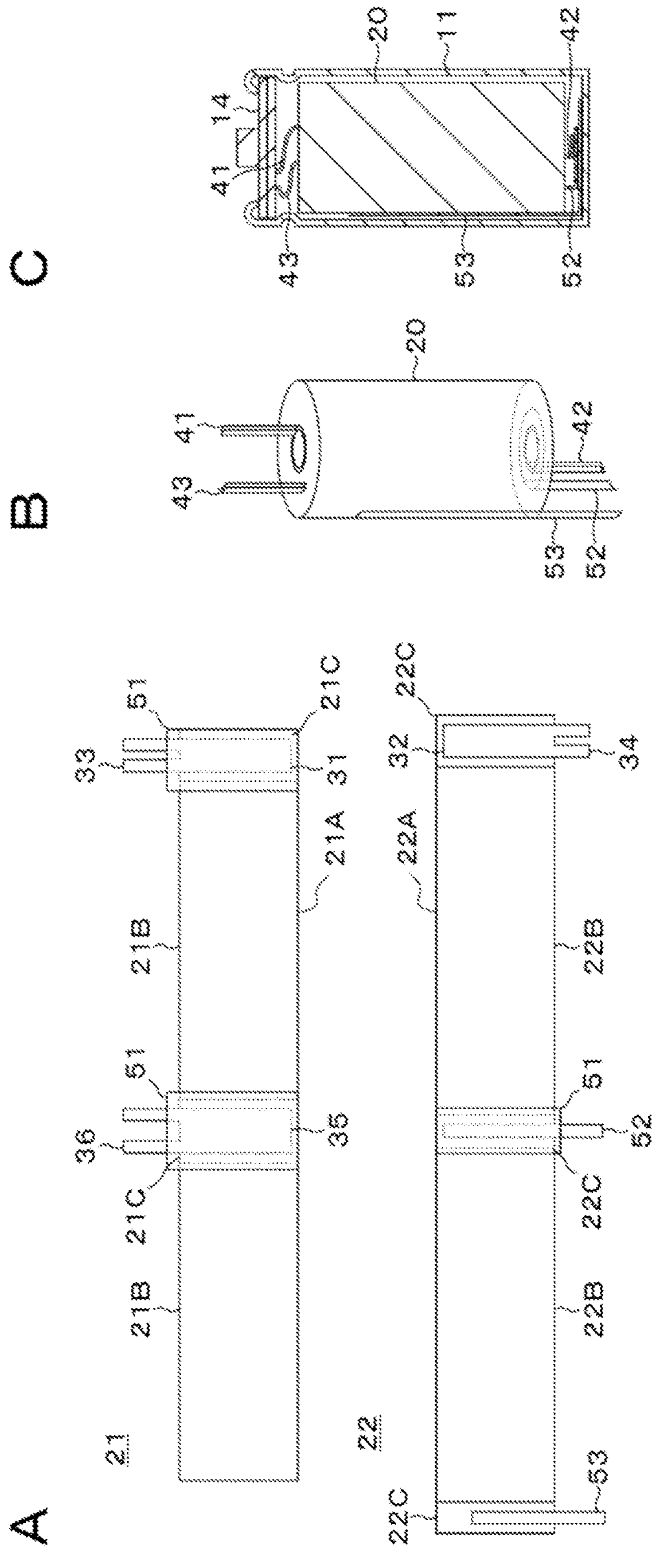
FIG. 12 includes views A to C that are diagrams for illustrating Modification Example 4.
Figure 13:
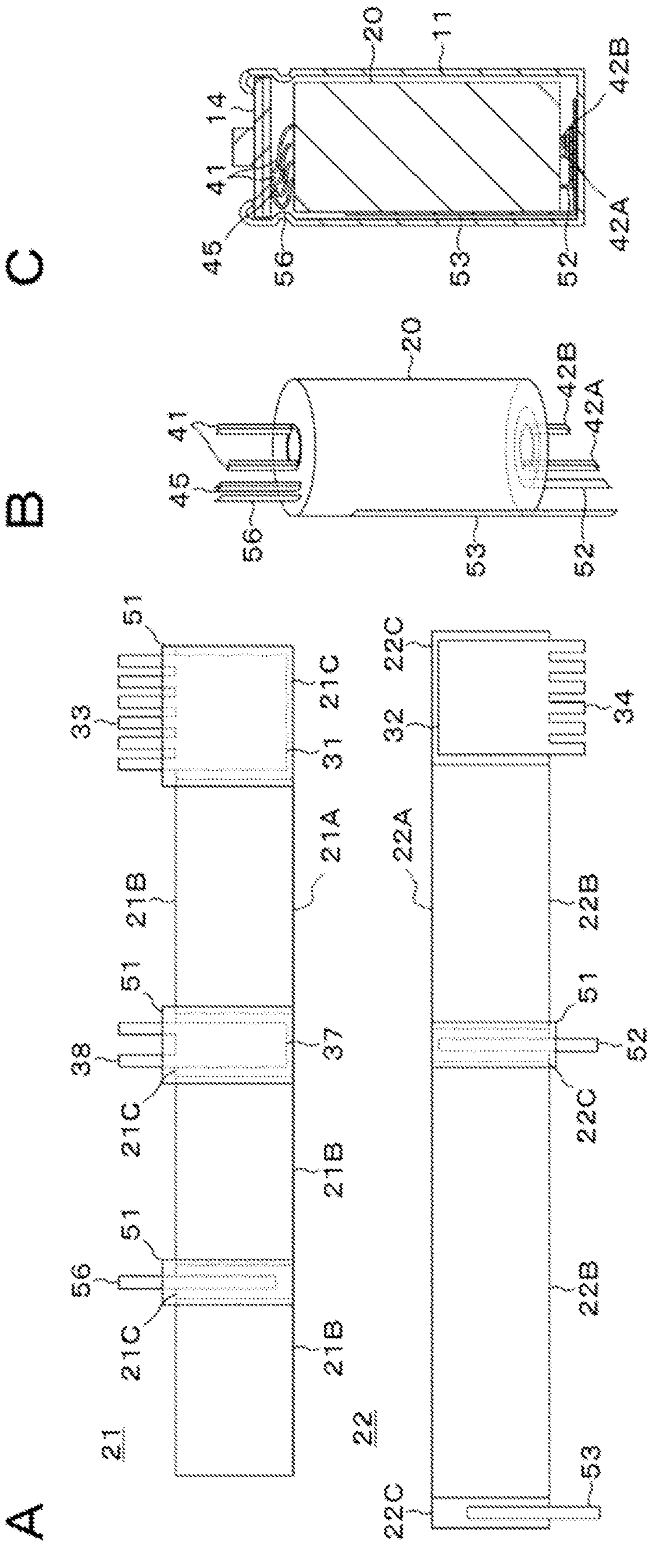
FIG. 13 includes views A to C that are diagrams for illustrating Modification Example 5.
Figure 14:
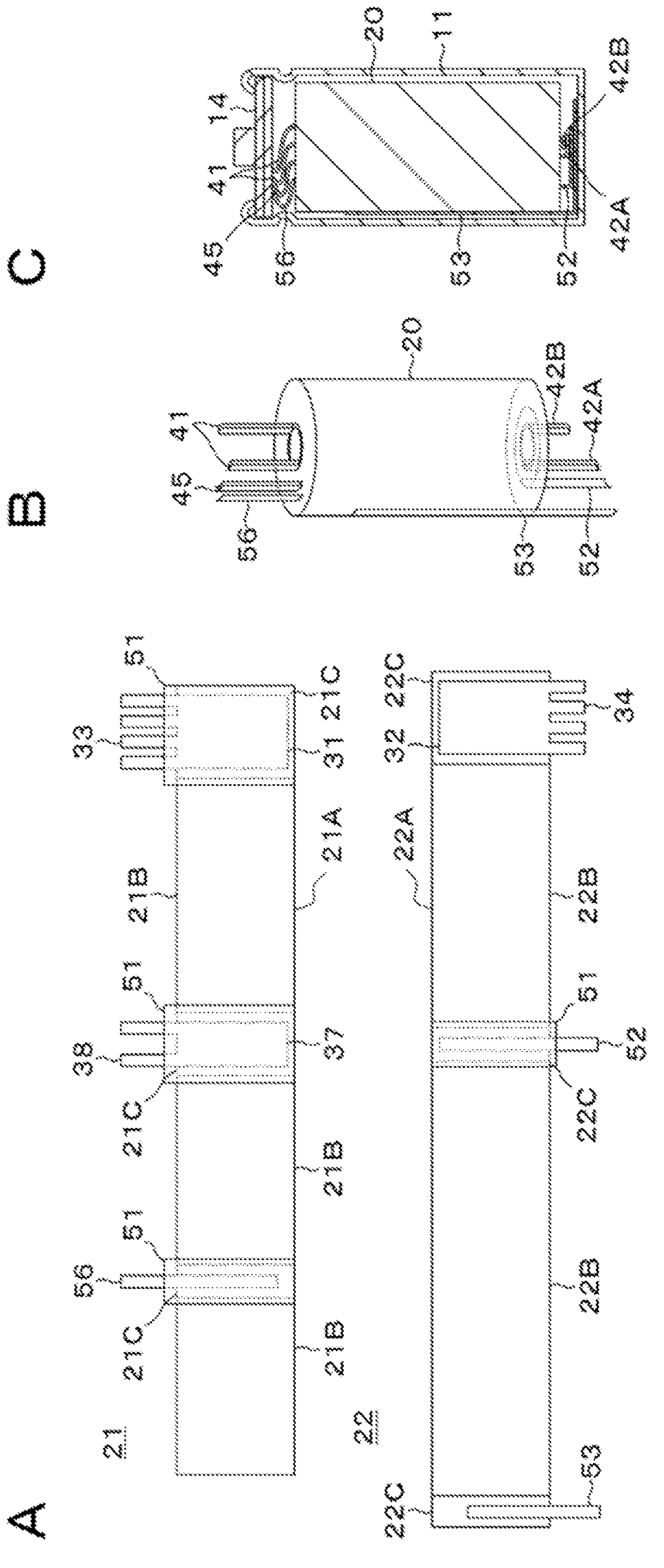
FIG. 14 includes views A to C that are diagrams for illustrating Modification Example 6.
Figure 15:
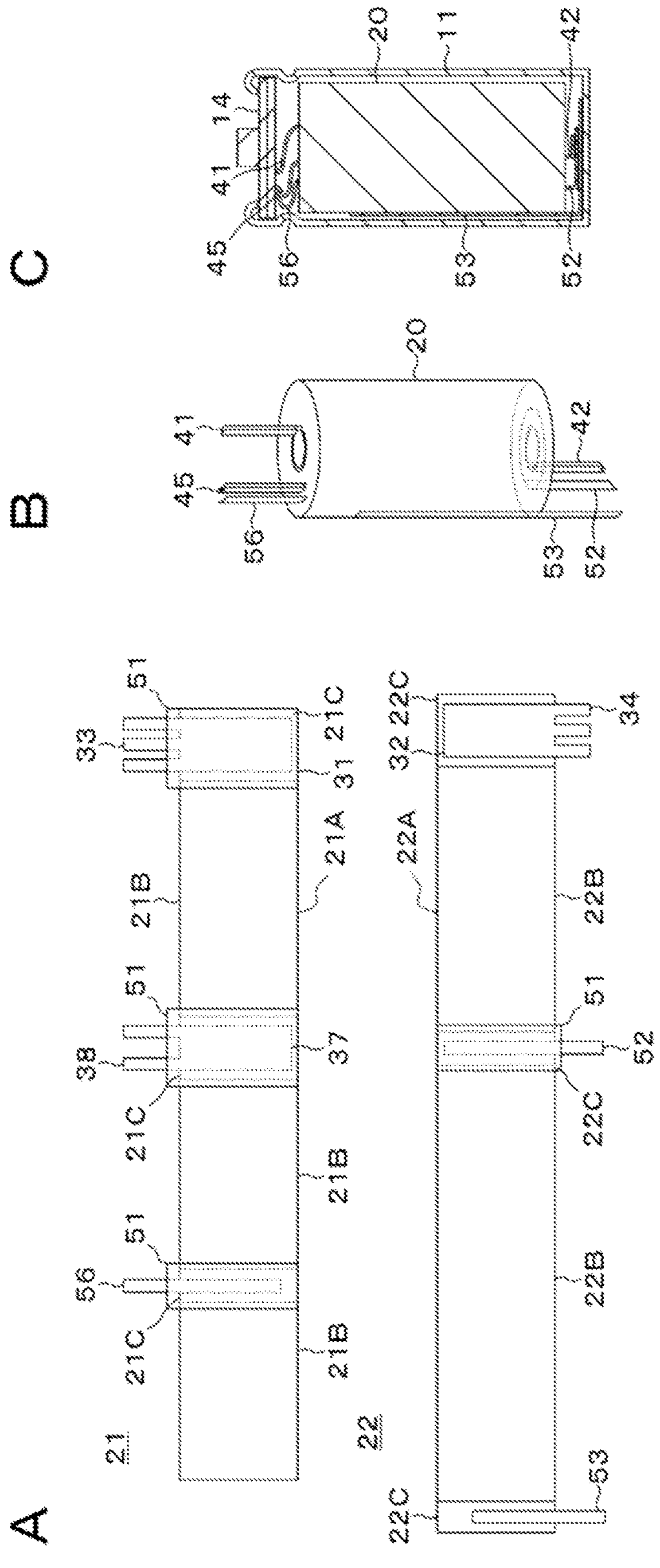
FIG. 15 includes views A to C that are diagrams for illustrating Modification Example 7.
Figure 16:
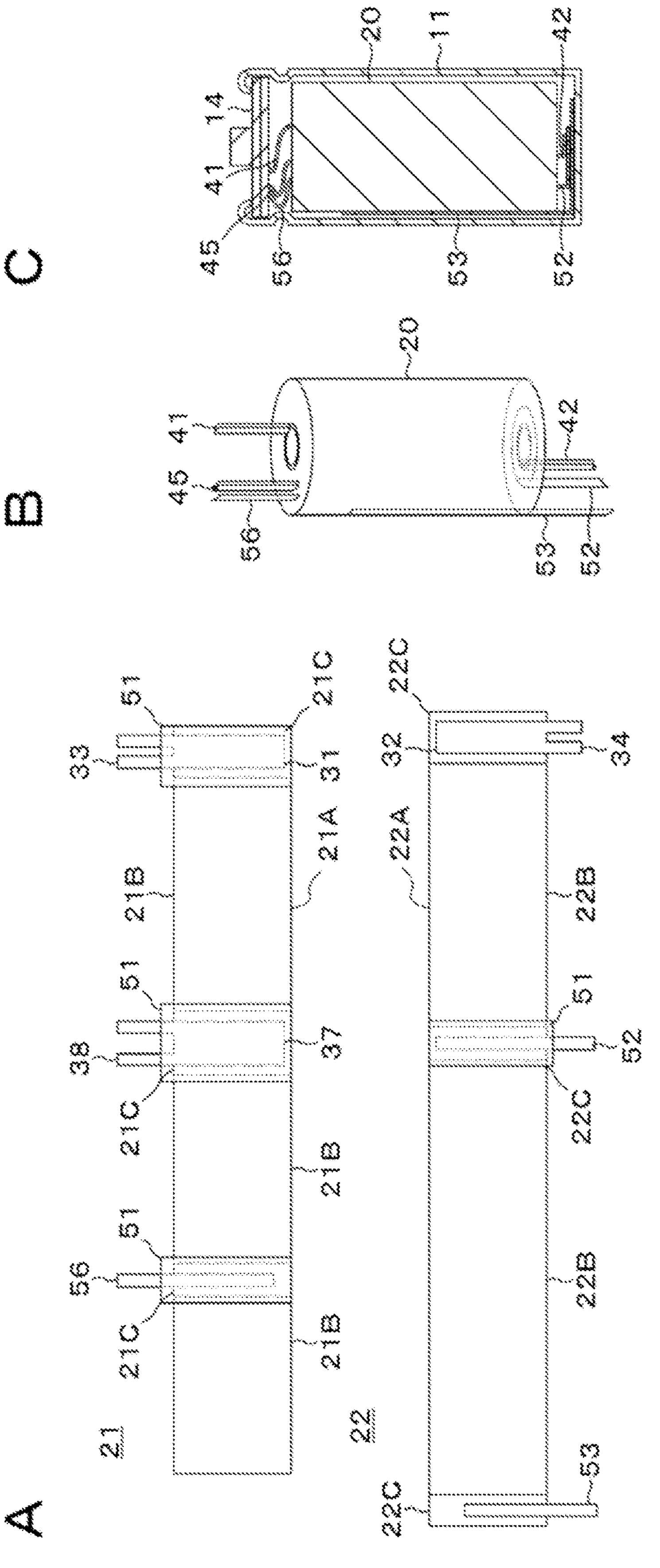
FIG. 16 includes views A to C that are diagrams for illustrating Modification Example 8.

The negative electrodes of Modification Examples 1 to 4 had structures in which a tab 53 was added on the winding ending side of a negative electrode to the negative electrodes of Examples 2 to 5. FIG. 9 illustrates Modification Example 1 in which the tab 53 was added to Example 2, FIG. 10 illustrates Modification Example 2 in which the tab 53 was added to Example 3, FIG. 11 illustrates Modification Example 3 in which the tab 53 was added to Example 4, and FIG. 12 illustrates Modification Example 4 in which the tab 53 was added to Example 5. The tabs 53 of the negative electrodes added in Modification Example 1 to Modification Example 4 were welded to the can bottoms of the battery cans together with connecting parts 42 and the like.

Modification Example 5

As illustrated in FIG. 13A, a foil tab 37 was disposed at a position of about ⅓ the overall length from the winding starting side toward the winding ending side of the positive electrode 21, a tab 56 was disposed at a position of about ⅓ the overall length from the winding ending side toward the winding starting side of the positive electrode 21, and a foil tab 31 was disposed on the winding starting side of the positive electrode 21. The comb-like part 38 of the foil tab 37 was composed of two band-shaped projections, and the comb-like part 33 of the foil tab 31 was composed of six band-shaped projections. A tab 52 was disposed at a position of about ⅓ the overall length from the winding starting side toward the winding ending side of the negative electrode 22, a tab 53 was disposed on the winding ending side of the negative electrode 22, and a foil tab 32 was disposed on the winding starting side of the negative electrode 22. The comb-like part 34 of the foil tab 32 was composed of six band-shaped projections. As illustrated in FIG. 13B, the positive electrode 21 and the negative electrode 22 were stacked with a separator 23 interposed therebetween, and these were wound such that the two band-shaped projections of the comb-like part 38 of the foil tab 37 were superposed and united into one connecting part 45. The number of winding of the foil tab 37 of the positive electrode was set to 1 round. Further, the foil tab 31 and the foil tab 32 were each designed in the same manner as in Example 2. As illustrated in FIG. 13C, an electrode wound body 20 to which the foil tab 37, the tabs 52, 53, 56, and the foil tabs 31, 32 were joined was put in a battery can 11.

Modification Example 6

As illustrated in FIG. 14A to FIG. 14C, operations were performed in the same manner as in Modification Example 5 except that the numbers of the band-shaped projections of the comb-like parts 33, 34 of the foil tabs 31, 32 were each set to four. The foil tabs 31, 32 were each designed in the same manner as in Example 3.

Modification Example 7

As illustrated in FIG. 15A to FIG. 15C, operations were performed in the same manner as in Modification Example 5 except that the numbers of the band-shaped projections of the comb-like parts 33, 34 of the foil tabs 31, 32 were each set to three. The foil tabs 31, 32 were each designed in the same manner as in Example 4.

Modification Example 8

As illustrated in FIG. 16A to FIG. 16C, operations were performed in the same manner as in Modification Example 5 except that the numbers of the band-shaped projections of the comb-like parts 33, 34 of the foil tabs 31, 32 were each set to two. The foil tabs 31, 32 were each designed in the same manner as in Example 5.

In Modification Example 1 to Modification Example 4, there were attained rates of buckling occurrence similar to those in Example 2 to Example 5, and those Modification Examples are expected to result in lower resistance values of the electrode wound bodies than those of Example 2 to Example 5. In Modification Example 5 to Modification Example 8, there were attained rates of buckling occurrence similar to those in Example 2 to Example 5, and those Modification Examples are expected to result in lower resistance values of the electrode wound bodies than those of Modification Example 1 to Modification Example 4.

The size of the battery 1 was set to 18650, but may be other sizes. The rated capacity of the battery 1 was set to 3000 mAh, but may be other values. The thicknesses of the positive electrode foil 21A, the negative electrode foil 22A, and the separator 23 may not be the values described above. The number of the band-shaped projections of the comb-like parts 33, 34 are not limited to those of Examples, and may be other values.

Application Example (1) Battery Pack

Figure 17:
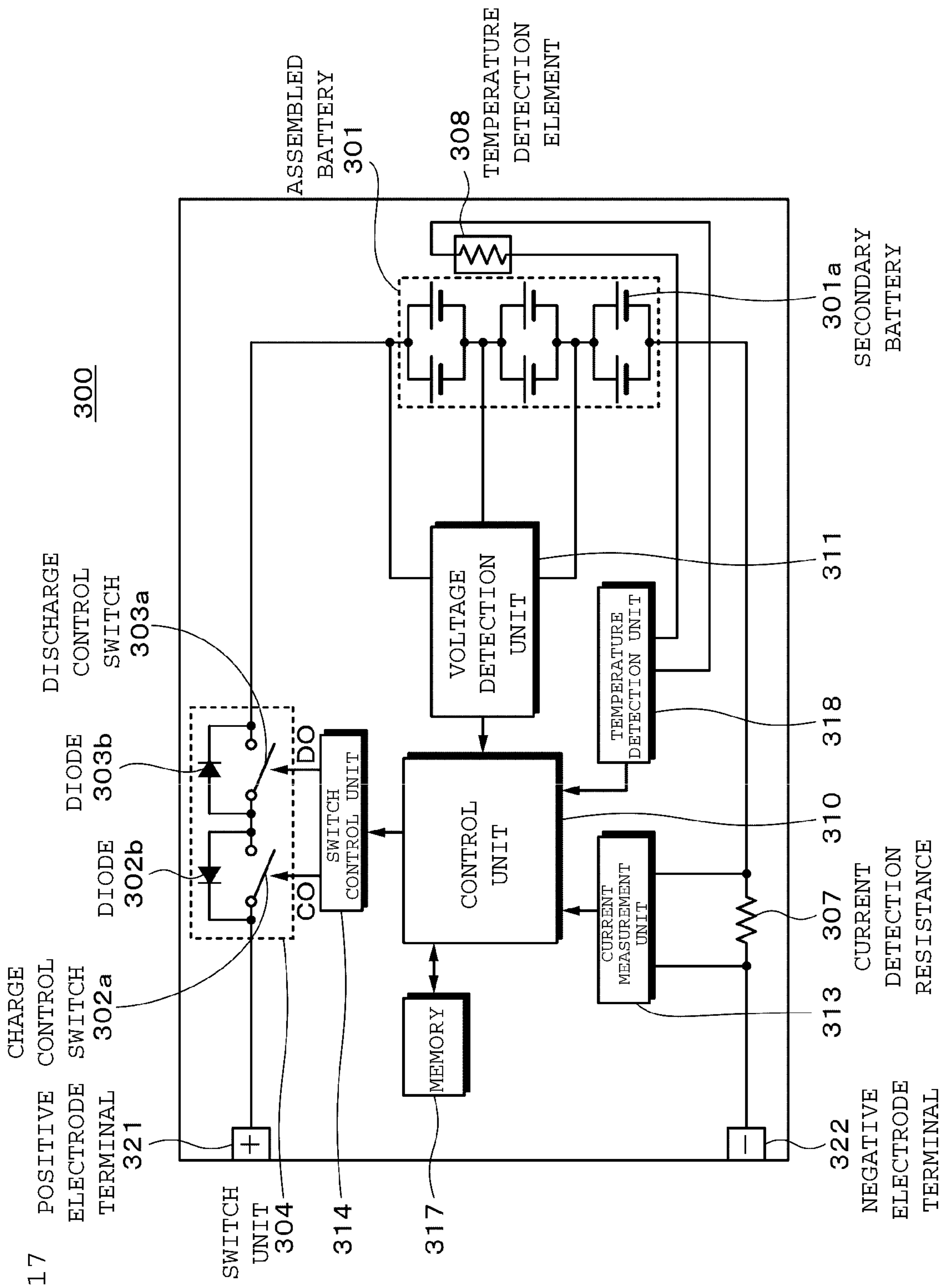
FIG. 17 is a connection diagram to be used for illustrating a battery pack as an application example according to an embodiment.

FIG. 17 is a block diagram showing a circuit configuration example when the battery 1 according to an embodiment including Examples is applied to a battery pack 300. The battery pack 300 includes an assembled battery 301, a switch unit 304 including a charge control switch 302*a* and a discharge control switch 303*a*, a current detection resistor 307, a temperature detection element 308, and a control unit 310. The control unit 310 controls each device, and can perform charge/discharge control when abnormal heat generation occurs, or can calculate and correct the remaining capacity of the battery pack 300.

When the battery pack 300 is charged, a positive electrode terminal 321 and a negative electrode terminal 322 are connected to a positive electrode terminal and a negative electrode terminal of a charger, respectively, and charging is performed. In addition, when an electronic device connected to the battery pack 300 is used, the positive electrode terminal 321 and the negative electrode terminal 322 are connected to a positive electrode terminal and a negative electrode terminal of the electronic device, respectively, and discharging is performed.

The assembled battery 301 is formed by connecting a plurality of secondary batteries 301*a* in series and/or in parallel. In FIG. 17, a case where six secondary batteries 301*a* are connected in two-parallel and three-series (2P3S) is illustrated as an example, but any connection method may be employed.

A temperature detection unit 318 is connected to a temperature detection element 308 (for example, a thermistor), measures the temperature of the assembled battery 301 or the battery pack 300, and supplies the measured temperature to the control unit 310. A voltage detection unit 311 measures the voltages of the assembled battery 301 and each of the secondary batteries 301*a* constituting the assembled battery 301, and A/D converts the measured voltages, and supplies the converted voltages to the control unit 310. A current measurement unit 313 measures a current using the current detection resistor 307, and supplies the measured current to the control unit 310.

The switch control unit 314 controls the charge control switch 302*a* and the discharge control switch 303*a* of the switch unit 304 based on the voltage and the current input from the voltage detection unit 311 and the current measurement unit 313. When the voltage of any of the secondary batteries 301*a* becomes equal to or lower than an overcharge detection voltage or an overdischarge detection voltage, or when a large current rapidly flows, the switch control unit 314 prevents overcharge, overdischarge, or overcurrent charge and discharge by sending a control signal for turning-off to the switch unit 304. Here, when the secondary battery is a lithium ion secondary battery, the overcharge detection voltage is defined to be, for example, 4.20 V±0.05 V, and the overdischarge detection voltage is defined to be, for example, 2.4 V±0.1 V.

After the charge control switch 302*a* or the discharge control switch 303*a* is turned off, charging or discharging can be performed only through a diode 302*b* or a diode 303*b*. As these charge/discharge switches, semiconductor switches such as MOSFET can be used. In this case, the parasitic diodes of the MOSFET function as the diodes 302*b* and 303*b*. It is noted that the switch unit 304 is provided on the + side in FIG. 17, but it may be provided on the − side.

A memory 317 includes a RAM and a ROM, and includes, for example, an erasable programmable read only memory (EPROM) which is a nonvolatile memory. In the memory 317, the numerical value calculated by the control unit 310, the battery characteristics in an initial state of each secondary battery 301*a* measured at the stage of the manufacturing process, and the like are stored in advance, and can be appropriately rewritten. In addition, by storing the full charge capacity of the secondary battery 301*a*, the remaining capacity can be calculated in collaboration with the control unit 310.

(2) Electronic Device

The battery 1 according to an embodiment including Examples described herein can be mounted on a device such as an electronic device, an electric transport device, and a power storage device and used to supply electric power.

Examples of the electronic device include laptop personal computers, smartphones, tablet terminals, personal digital assistants (PDAs), mobile phones, wearable terminals, video movies, digital still cameras, electronic books, music players, headphones, game machines, pacemakers, hearing aids, electric tools, televisions, lighting devices, toys, medical devices, and robots. Further, an electric transport device, a power storage device, an electric tool, and an electric unmanned aerial vehicle, which will be described later, may also be included in the electronic device in a broad sense.

Examples of the electric transport device include electric vehicles (including hybrid vehicles), electric motorcycles, electrically assisted bicycles, electric buses, electric carts, automated guided vehicles (AGV), and railway vehicles. Electric passenger aircrafts and electric unmanned aerial vehicles for transportation are also included. The secondary battery according to the present invention is used not only as a power supply for driving these devices, but also as an auxiliary power supply, a power supply for energy regeneration, and the like.

Examples of the power storage device include a power storage module for commercial or household use, a power storage power source for an architectural structure such as a residential house, a building, and an office or for a power generation facility.

(3) Electric Tool

Figure 18:
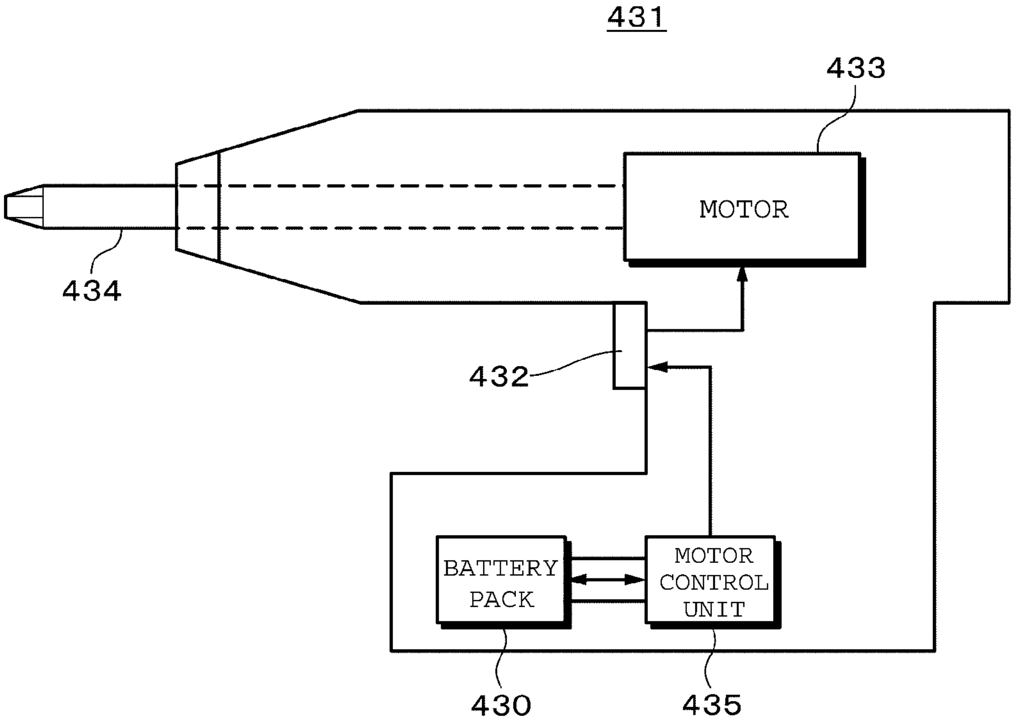
FIG. 18 is a connection diagram to be used for illustrating an electric tool as an application example according to an embodiment.

With reference to FIG. 18 will be schematically described an example of an electric screwdriver as an electric tool to which the present technology can be applied. An electric screwdriver 431 is provided with a motor 433 that transmits rotational power to a shaft 434 and a trigger switch 432 to be operated by a user. A screw or the like is driven into an object by the shaft 434 through an operation of the trigger switch 432.

A battery pack 430 and a motor control unit 435 are accommodated in a lower housing of a handle of the electric screwdriver 431. The battery pack 300 described above can be used as the battery pack 430. The battery pack 430 is built in or detachable from the electric screwdriver 431. The battery pack 430 can be attached to the charging device in a state of being built in or detached from the electric screwdriver 431.

Each of the battery pack 430 and the motor control unit 435 is provided with a microcomputer. Power is supplied from the battery pack 430 to the motor control unit 435, and charge/discharge information on the battery pack 430 is communicated between the microcomputers of the battery pack 430 and the motor control unit 435. The motor control unit 435 controls the rotation/stop and the direction of rotation of the motor 433, and can further cut off the power supply to a load (motor 433, etc.) at the time of overdischarge.

(4) Power Storage System for Electric Vehicle

Figure 19:
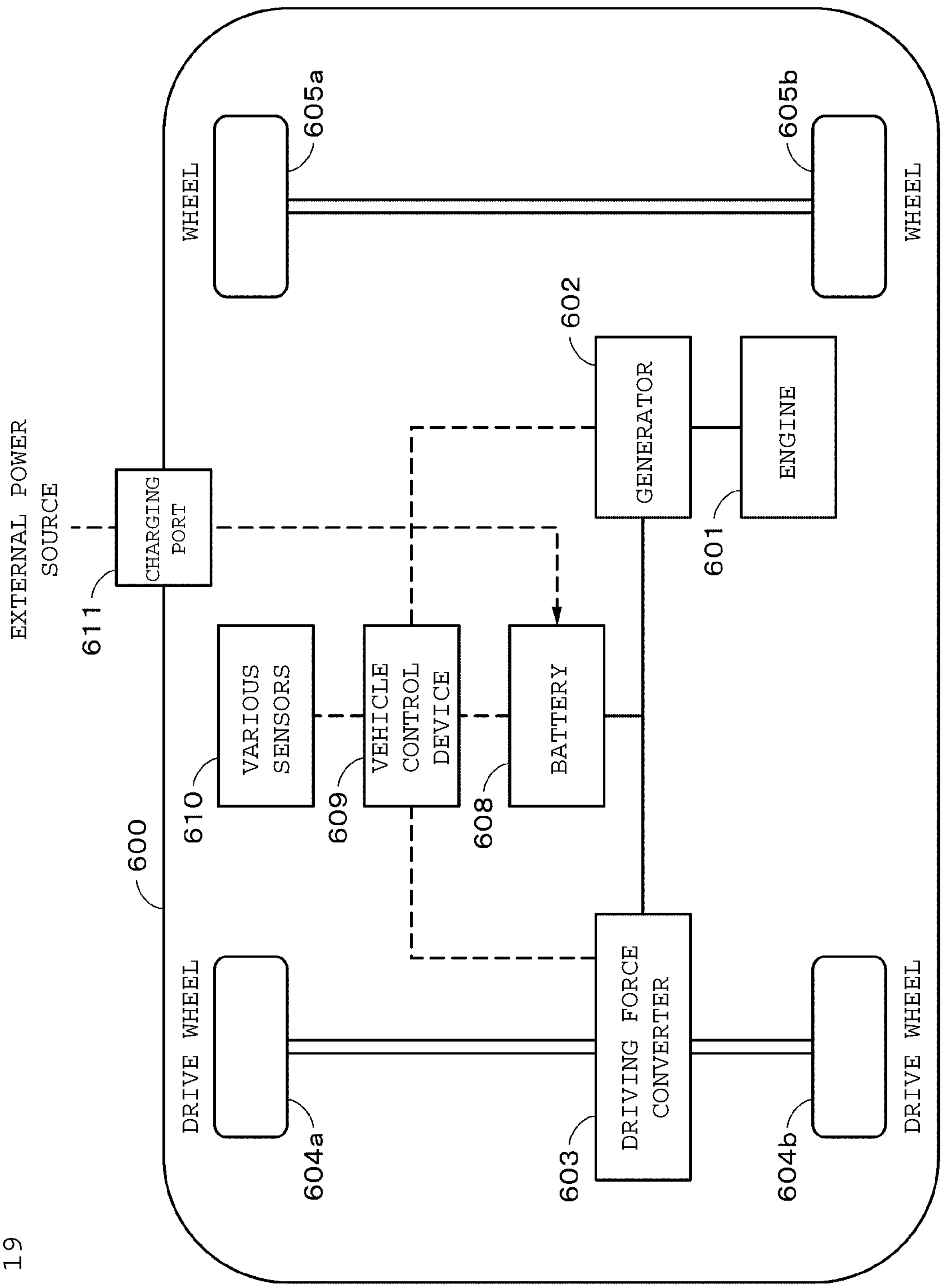
FIG. 19 is a connection diagram to be used for illustrating an electric vehicle as an application example according to an embodiment.

As an example of applying the present technology to a power storage system for electric vehicles, FIG. 19 schematically illustrates a configuration example of a hybrid vehicle (HV) employing a series hybrid system. The series hybrid system is a vehicle that travels with a power driving force converter using a power generated by an engine-powered generator or the power temporarily stored in a battery.

On a hybrid vehicle 600 are mounted an engine 601, a generator 602, a power driving force converter 603 (DC motor or AC motor; hereinafter simply referred to as "motor 603"), a drive wheel 604*a*, a drive wheel 604*b*, a wheel 605*a*, a wheel 605*b*, a battery 608, a vehicle control device 609, various sensors 610, and a charging port 611. The battery pack 300 described above or a power storage module equipped with a plurality of the batteries 1 can be applied to the battery 608. The secondary battery has a cylindrical shape, a square shape, or a laminated shape.

The motor 603 is operated by the power from the battery 608, and the torque of the motor 603 is transmitted to the drive wheels 604*a*, 604*b*. The torque of the engine 601 is transmitted to the generator 602, and the power generated by the generator 602 using the torque can be stored in the battery 608. The various sensors 610 control the engine speed through the vehicle control device 609, and control the opening degree of a throttle valve (not shown). The various sensors 610 include a speed sensor, an acceleration sensor, an engine speed sensor, and the like.

When the hybrid vehicle 600 is decelerated by a braking mechanism (not shown), a resistance force at the time of the deceleration is applied to the motor 603 as a torque, and a regenerative power generated by the torque is stored in the battery 608. In addition, although not illustrated, an information processing device (e.g., a remaining battery level display device) that performs information processing related to vehicle control based on information related to the secondary battery may also be provided. The battery 608 can receive power supply by being connected to an external power source through the charging port 611 of the hybrid vehicle 600 and store the power. Such an HV vehicle is called a plug-in hybrid vehicle (PHV or PHEV).

In the above, a series hybrid vehicle has been described as an example, but the present invention can also be applied to a parallel system in which an engine and a motor are used in combination, or a hybrid vehicle in which a series system and a parallel system are combined. Further, the present invention can also be applied to an electric vehicle (EV or BEV) and a fuel cell vehicle (FCV) that travel only by a drive motor without using an engine.

DESCRIPTION OF REFERENCE SYMBOLS

1: Lithium ion battery
12,13: Insulating plate
20: Electrode wound body
21: Positive electrode
22: Negative electrode
23: Separator
24: Center pin
25: Positive electrode lead
26: Negative electrode lead
31, 32: Foil tab
33, 34: Comb-like part
35, 37: Foil tab
36, 38: Comb-like part
39: Plate-like part
41, 42, 42A, 42B 43: Connecting part
51: Insulating tape
52, 53, 54: Tab of negative electrode
55, 56: Tab of positive electrode It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery, comprising:
an electrode wound body having a structure in which a band-shaped positive electrode and a band-shaped negative electrode are stacked with a separator interposed therebetween and wound;
a battery can that accommodates the electrode wound body,
wherein
the positive electrode has a positive electrode active material layer on both sides of a band-shaped positive electrode foil,
the negative electrode has a negative electrode active material layer on both sides of a band-shaped negative electrode foil,
the electrode wound body has a positive electrode foil tab between a winding starting side and a winding ending side of the positive electrode and a negative electrode tab between a winding starting side and a winding ending side of the negative electrode,
the positive electrode foil tab has a plate-like part joined on the winding starting side of the positive electrode, and a comb-like part protruding from the positive electrode, and
the comb-like part is a connecting part of the electrode wound body; and
a flat plate-shaped foil tab on the winding starting side of each of the positive electrode and the negative electrode,
wherein the foil tab has a plate-like part joined on the winding starting side of the positive electrode or the negative electrode, a comb-like part protruding from the positive electrode or the negative electrode, and the comb-like part is a connecting part of the electrode wound body, and
wherein intervals between band-shaped projections of the comb-like part are set to increase from the winding starting side.

2. The secondary battery according to claim 1, wherein a position of the positive electrode foil tab is an approximately middle position of the positive electrode, and a position of the negative electrode tab is an approximately middle position of the negative electrode.

3. The secondary battery according to claim 1, further comprising a tab on the winding ending side of the negative electrode.

4. The secondary battery according to claim 1, wherein
a position of the positive electrode foil tab is a position of about ⅓ an overall length from the winding starting side and toward the winding ending side of the positive electrode,
a position of the positive electrode tab is a position of about ⅓ an overall length from the winding starting side and toward the winding ending side of the positive electrode,
a position of the negative electrode tab is a position of about ⅓ an overall length from the winding starting side and toward the winding ending side of the negative electrode,
the secondary battery further comprises a flat plate-shaped foil tab on the winding starting side of each of the positive electrode and the negative electrode,
the foil tab has a plate-like part joined on the winding starting side of the positive electrode or the negative electrode, and a comb-like part protruding from the positive electrode or the negative electrode, and
the comb-like part is a connecting part of the electrode wound body.

5. The secondary battery according to claim 1, wherein a material of the positive electrode foil tab and a material of the foil tab of the positive electrode are each any one or a composite material of aluminum, titanium, and stainless steel (SUS).

6. The secondary battery according to claim 1, wherein a material of the foil tab of the negative electrode is any one or a composite material of copper, a copper-nickel alloy, nickel, zinc, a copper-zinc alloy, and a copper-zinc-nickel alloy.

7. The secondary battery according to claim 1, wherein a thickness of the positive electrode foil tab, a thickness of the foil tab of the positive electrode or a thickness of the foil tab of the negative electrode is 0.020 mm or more and 0.100 mm or less.

8. The secondary battery according to claim 1, wherein a content of the silicon oxide contained in the negative electrode active material layer is 5 wt % or more and 20 wt % or less.

9. An electronic device comprising the secondary battery according to claim 1.

10. An electric tool comprising the secondary battery according to claim 1.

11. A secondary battery, comprising:

an electrode wound body having a structure in which a band-shaped positive electrode and a band-shaped negative electrode are stacked with a separator interposed therebetween and wound;

a battery can that accommodates the electrode wound body, wherein the positive electrode has a positive electrode active material layer on both sides of a band-shaped positive electrode foil, the negative electrode has a negative electrode active material layer on both sides of a band-shaped negative electrode foil, the electrode wound body has a positive electrode foil tab between a winding starting side and a winding ending side of the positive electrode and a negative electrode tab between a winding starting side and a winding ending side of the negative electrode, the positive electrode foil tab has a plate-like part joined on the winding starting side of the positive electrode, and a comb-like part protruding from the positive electrode, and the comb-like part is a connecting part of the electrode wound body; and a flat plate-shaped foil tab on the winding starting side of each of the positive electrode and the negative electrode, wherein the foil tab has a plate-like part joined on the winding starting side of the positive electrode or the negative electrode, a comb-like part protruding from the positive electrode or the negative electrode, and the comb-like part is a connecting part of the electrode wound body, and wherein a number of winding of the foil tab of the positive electrode or a number of winding of the foil tab of the negative electrode is 1 round or more and 2.5 rounds or less.

12. The secondary battery according to claim 11, wherein a position of the positive electrode foil tab is an approximately middle position of the positive electrode, and a position of the negative electrode tab is an approximately middle position of the negative electrode.

13. The secondary battery according to claim 11, further comprising a tab on the winding ending side of the negative electrode.

14. The secondary battery according to claim 11, wherein a position of the positive electrode foil tab is a position of about ⅓ an overall length from the winding starting side and toward the winding ending side of the positive electrode, a position of the positive electrode tab is a position of about ⅓ an overall length from the winding starting side and toward the winding ending side of the positive electrode, a position of the negative electrode tab is a position of about ⅓ an overall length from the winding starting side and toward the winding ending side of the negative electrode, the secondary battery further comprises a flat plate-shaped foil tab on the winding starting side of each of the positive electrode and the negative electrode, the foil tab has a plate-like part joined on the winding starting side of the positive electrode or the negative electrode, and a comb-like part protruding from the positive electrode or the negative electrode, and the comb-like part is a connecting part of the electrode wound body.

15. The secondary battery according to claim 11, wherein a material of the positive electrode foil tab and a material of the foil tab of the positive electrode are each any one or a composite material of aluminum, titanium, and stainless steel (SUS).

16. The secondary battery according to claim 11, wherein a material of the foil tab of the negative electrode is any one or a composite material of copper, a copper-nickel alloy, nickel, zinc, a copper-zinc alloy, and a copper-zinc-nickel alloy.

17. The secondary battery according to claim 11, wherein a thickness of the positive electrode foil tab, a thickness of the foil tab of the positive electrode or a thickness of the foil tab of the negative electrode is 0.020 mm or more and 0.100 mm or less.

18. The secondary battery according to claim 11, wherein a content of the silicon oxide contained in the negative electrode active material layer is 5 wt % or more and 20 wt % or less.

19. An electronic device comprising the secondary battery according to claim 14.

20. An electric tool comprising the secondary battery according to claim 11.

* * * * *